United States Patent
Rodriguez

(10) Patent No.: US 12,455,418 B2
(45) Date of Patent: Oct. 28, 2025

(54) DUPLEX FIBER OPTIC ASSEMBLY WITH REPOSITIONABLE LATCH HOUSING FOR POLARITY REVERSAL, AND RELATED METHODS

(71) Applicant: CORNING RESEARCH & DEVELOPMENT CORPORATION, Corning, NY (US)

(72) Inventor: Diana Rodriguez, Mansfield, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 288 days.

(21) Appl. No.: 18/303,999

(22) Filed: Apr. 20, 2023

(65) Prior Publication Data
US 2024/0353629 A1    Oct. 24, 2024

(51) Int. Cl.
*G02B 6/38*  (2006.01)
*G02B 6/40*  (2006.01)

(52) U.S. Cl.
CPC .......... *G02B 6/3831* (2013.01); *G02B 6/406* (2013.01)

(58) Field of Classification Search
None
See application file for complete search history.

(56) References Cited

U.S. PATENT DOCUMENTS

| | | |
|---|---|---|
| 5,579,425 A | 11/1996 | Lampert et al. |
| 7,641,398 B2 | 1/2010 | O'Riorden et al. |
| 7,712,970 B1 | 5/2010 | Lee |
| 8,152,385 B2 * | 4/2012 | de Jong ............ G02B 6/38875 385/71 |
| 8,221,007 B2 | 7/2012 | Peterhans et al. |
| 8,376,629 B2 | 2/2013 | Cline et al. |
| 8,465,317 B2 | 6/2013 | Gniadek et al. |
| 8,662,760 B2 | 3/2014 | Cline et al. |
| 8,764,308 B2 | 7/2014 | Irwin et al. |
| 9,223,096 B2 | 12/2015 | Skluzacek et al. |
| 9,448,370 B2 | 9/2016 | Xue et al. |
| 9,465,172 B2 | 10/2016 | Shih |

(Continued)

FOREIGN PATENT DOCUMENTS

| | | |
|---|---|---|
| CN | 102749682 A | 10/2012 |
| CN | 203720408 U | 7/2014 |

(Continued)

*Primary Examiner* — Jerry Rahll
(74) *Attorney, Agent, or Firm* — Adam R. Weeks

(57) ABSTRACT

A duplex fiber optic connector assembly suitable for polarity reversal includes first and second fiber optic connector subassemblies received by a primary housing that in turn is received by a latch housing. The primary housing is configured to be releasably engaged with the latch housing in either an upwardly-facing or downwardly-facing configuration (e.g., the latch housing is repositionable) for polarity reversal, and the primary housing may be removed from the latch housing by movement of the primary housing in a rearward direction. A manually actuatable engagement feature of the primary housing is configured to be received by a receiving feature of the latch housing. A manually actuatable latch mechanism of the latch housing is configured to permit releasable engagement with a fiber optic adapter housing separate from the duplex fiber optic connector assembly.

14 Claims, 18 Drawing Sheets

(56) References Cited

U.S. PATENT DOCUMENTS

| | | |
|---|---|---|
| 9,599,778 B2 | 3/2017 | Wong et al. |
| 9,618,703 B2 | 4/2017 | Izumi et al. |
| 9,678,283 B1* | 6/2017 | Chang .................. G02B 6/3857 |
| 9,678,285 B2 | 6/2017 | Hill et al. |
| 9,684,130 B2 | 6/2017 | Veatch et al. |
| 9,825,403 B2 | 11/2017 | De Dios Martin et al. |
| 9,869,825 B2 | 1/2018 | Bailey et al. |
| 9,927,582 B2 | 3/2018 | Chang et al. |
| 9,946,035 B2 | 4/2018 | Gustafson et al. |
| 9,971,102 B2 | 5/2018 | Raven et al. |
| 10,042,129 B2 | 8/2018 | Taira et al. |
| 10,067,301 B2 | 9/2018 | Murray et al. |
| 10,078,186 B1 | 9/2018 | Hsu et al. |
| 10,158,194 B2 | 12/2018 | Takano et al. |
| 10,162,129 B2 | 12/2018 | Smith et al. |
| 10,185,100 B2 | 1/2019 | Takano et al. |
| 10,191,230 B2 | 1/2019 | Wong et al. |
| 10,444,441 B1 | 10/2019 | Ho et al. |
| 10,520,687 B2 | 12/2019 | Lee |
| 10,634,854 B2 | 4/2020 | Davidson et al. |
| 10,712,512 B2 | 7/2020 | Ho et al. |
| 2002/0090177 A1 | 7/2002 | Anderson et al. |
| 2010/0220961 A1* | 9/2010 | de Jong ............. G02B 6/38875 385/77 |
| 2011/0081113 A1 | 4/2011 | Jones |
| 2011/0299814 A1 | 12/2011 | Nakagawa |
| 2011/0318949 A1 | 12/2011 | Adams |
| 2012/0155810 A1 | 6/2012 | Nakagawa |
| 2013/0163934 A1 | 6/2013 | Lee et al. |
| 2014/0050443 A1 | 2/2014 | Lee |
| 2015/0177463 A1 | 6/2015 | Lee et al. |
| 2015/0212282 A1 | 7/2015 | Lin |
| 2015/0277059 A1* | 10/2015 | Raven .................. G02B 6/3879 385/78 |
| 2017/0227720 A1 | 8/2017 | Lin |
| 2017/0363818 A1 | 12/2017 | Suzic |
| 2020/0049902 A1 | 2/2020 | Li |
| 2020/0116955 A1 | 4/2020 | Ho et al. |
| 2020/0393630 A1 | 12/2020 | Wong et al. |
| 2021/0141162 A1 | 5/2021 | Ma et al. |
| 2021/0263239 A1 | 8/2021 | Sung-Chi |
| 2021/0263242 A1 | 8/2021 | Lin |
| 2021/0302665 A1 | 9/2021 | Gandla et al. |
| 2021/0302666 A1 | 9/2021 | Gandla et al. |

FOREIGN PATENT DOCUMENTS

| | | |
|---|---|---|
| CN | 203786336 U | 8/2014 |
| CN | 203965665 U | 11/2014 |
| CN | 106918869 A | 7/2017 |
| CN | 206696473 U | 12/2017 |
| CN | 207557531 U | 6/2018 |
| CN | 207965232 U | 10/2018 |
| CN | 110187445 A | 8/2019 |
| CN | 209281010 U | 8/2019 |
| CN | 210835337 U | 6/2020 |
| CN | 111399134 A | 7/2020 |
| CN | 211905777 U | 11/2020 |
| CN | 112415668 A | 2/2021 |
| CN | 112415669 A | 2/2021 |
| CN | 213876106 U | 8/2021 |
| CN | 213876107 U | 8/2021 |
| CN | 213876108 U | 8/2021 |
| CN | 214225494 U | 9/2021 |
| CN | 214225495 U | 9/2021 |
| CN | 214225496 U | 9/2021 |
| CN | 214225497 U | 9/2021 |
| CN | 214225498 U | 9/2021 |
| CN | 214225499 U | 9/2021 |
| CN | 214225500 U | 9/2021 |
| DE | 102014109024 A1 | 7/2015 |
| DE | 202016103178 U1 | 7/2016 |
| EP | 2906978 B1 | 6/2019 |
| GB | 2468188 A | 9/2010 |
| WO | 2013/013016 A1 | 1/2013 |
| WO | 2020/013059 A1 | 1/2020 |
| WO | 2020/021966 A1 | 1/2020 |

* cited by examiner

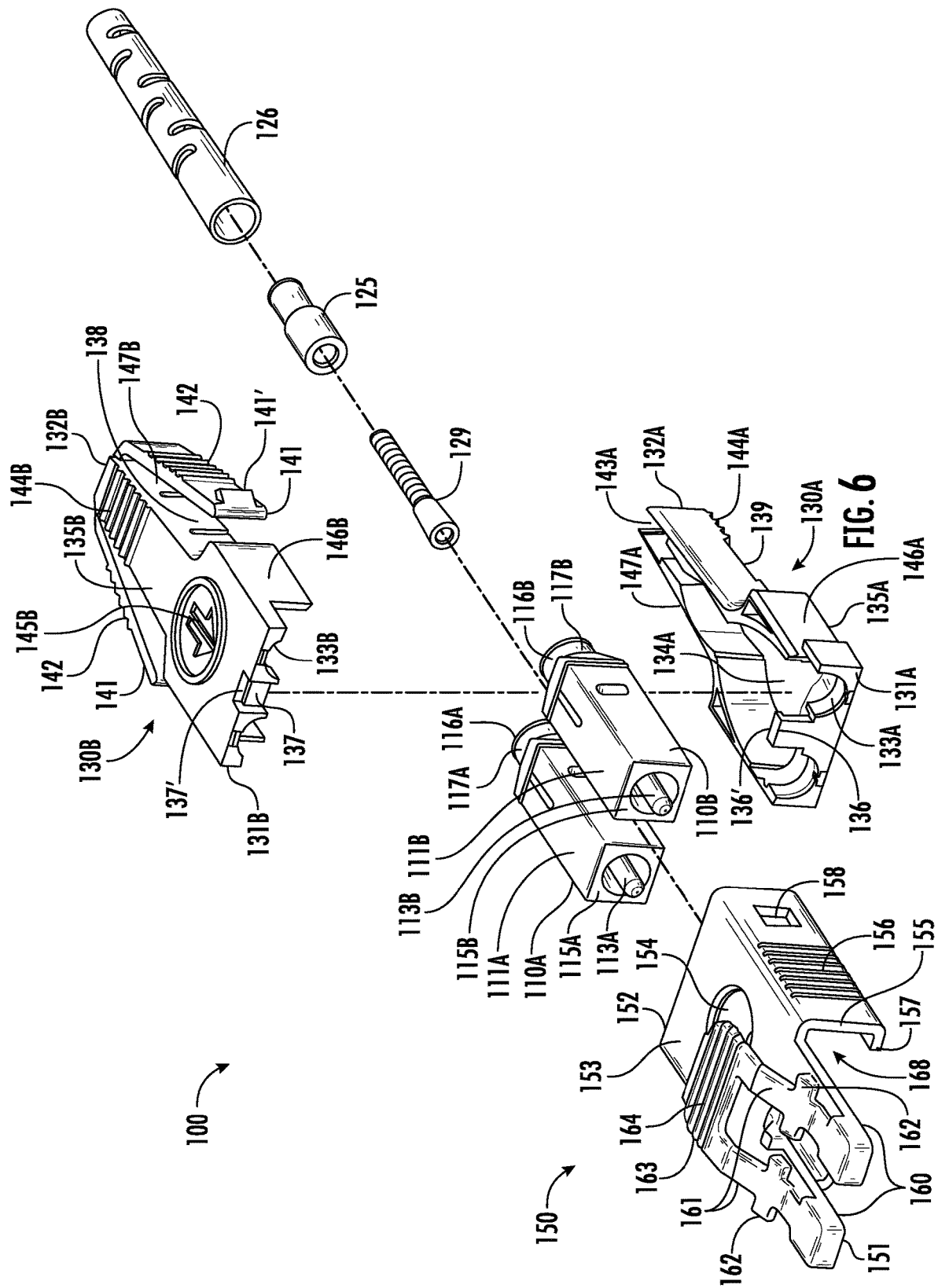

DUPLEX FIBER OPTIC ASSEMBLY WITH REPOSITIONABLE LATCH HOUSING FOR POLARITY REVERSAL, AND RELATED METHODS

BACKGROUND

The disclosure relates generally to fiber optic assemblies used in telecommunication systems, and in particular relates to duplex fiber optic connector assemblies and fiber optic cable assemblies permitting polarity reversal, and methods of fabricating and using such assemblies.

Optical fibers are useful in a wide variety of applications, including the telecommunications industry for voice, video, and data transmission. Continuous increases in bandwidth utilization has created density-related issues within even the largest data centers, including airflow and access to connectors in dense applications. Each piece of equipment within a data center is interconnected to other equipment or different components within the same cabinet using jumper cables. Jumper cable assemblies may include single fiber connectors and cables (i.e., simplex cable assemblies) or may be organized into sets of two, with one input and one output (i.e., duplex cable assemblies).

It is commonplace to integrate cable portions of a two-cable duplex cable assembly into a single cable duplex jumper, thereby reducing by half the number of cables required to service a given data center. Most multi-fiber cable assemblies used in data centers follow a polarity scheme established by Addendum 7 to ANSI/TIA/EIA/568B.1 entitled Guidelines for Maintaining Polarity using Array Connectors. Polarity for duplex jumpers is typically either dedicated A-to-B or A-to-A, depending upon the application, and polarity standards also apply to harnesses that break out array connectors (e.g., multi-fiber push-on (MPO) or the like) to double fiber cables. However, use of single cable duplex jumpers increases the effort required to address connections made with incorrect polarity.

One method in the art for correcting polarity miscues in duplex connector assemblies is shown in U.S. Pat. No. 8,152,385, which discloses a duplex fiber optic connector assembly suitable for in situ polarity reversal, including first and second fiber optic connector subassemblies received by a housing and each having a cantilever-type latch arm. FIG. 1 shows a conventional fiber optic connector subassembly 10 of this type, including a body structure 11 having a bore 12 containing a ferrule 13 having a passage 14 for receiving an optical fiber (not shown). The ferrule 13 protrudes from a front end 15 of the subassembly 10 and is biased in a forward direction by an internal spring 18. An annular recess 17 is provided near a rear end 16 of the subassembly 10, and a cantilever-type latch arm 19 protrudes upwardly and rearwardly from the body structure 11. FIGS. 2 and 3 provide assembled and exploded perspective views, respectively, of a conventional duplex fiber optic connector assembly 20 (according to U.S. Pat. No. 8,152,385) including a housing 30 for receiving first and second fiber optic connector subassemblies 10A, 10B of a type according to FIG. 1. The first and second connector subassemblies 10A, 10B may independently rotate along their respective longitudinal axes within the housing 30 for polarity reversal. Ferrules 13A, 13B of the connector subassemblies 10A, 10B receive optical fibers 24A, 24B issuing from a fiber optic cable 20, which is secured to the housing 30 by a crimp band 25 that captures strength elements 22 and possibly portions of a cable jacket 21 of the cable 20. The housing 30 includes complementary housing portions 30A, 30B that couple together and enclose a cavity 30 with two apertures 33 for receiving rear portions of the connector subassemblies 10A, 10B. A removable trigger mechanism 35 fits over the boot 26 and fiber optic cable 20, and slides forward to engage the housing 30, wherein a flexible arm 36 of the trigger mechanism 35 is arranged to contact the latch arms 19A, 19B of the connector subassemblies 10A, 10B. The latch arms 19A, 19B include laterally-protruding tab members 9. The trigger mechanism 35 permits both latch arms 19A, 19B to be disengaged simultaneously (i.e., from an adapter housing as shown in FIG. 4) by pressing on a single trigger.

FIG. 4 shows a conventional duplex fiber optic adapter housing 50 configured to receive the conventional duplex fiber optic connector assembly 40 of FIG. 2. The adapter housing 50 has a unitary body 53 that includes a first end 51 defining first and second receiving cavities 54A, 54B, which are separated by a vertical wall 55 that extends from the first end 51 to a second end 52. An upper portion of each receiving cavity 54A, 54B has medial projections 59A, 59B configured to cooperate with the laterally-protruding tab members 9 of the latch arms 19A, 19B of the duplex fiber optic connector assembly 40. The second end 52 defines additional receiving cavities (not shown) aligned with the first and second receiving cavities 54A, 54B arranged to receive optical components (not shown).

FIG. 5 is a cross-sectional view of the duplex fiber optic connector assembly 40 of FIG. 2 received by the adapter housing 50 of FIG. 4, with the first connector subassembly 10A received by the first receiving cavity 54A. As shown, the first receiving cavity 54A is aligned with a third receiving cavity 64A that extends to the second end 52 of the adapter housing 50, wherein an optical component 60 is received by the third receiving cavity 64A to permit communication with an optical fiber retained by the ferrule 13A. A rear portion of the first connector subassembly 10A include the annular recess 17 is retained by housing portions 30A, 30B. As shown, the flexible arm 36 (of the trigger mechanism 35) is arranged in contact with the latch arm 19A, with the flexible arm 36 extending higher than a top of the adapter body 53 by an amount equal to a height h.

The conventional duplex fiber optic connector assembly 20 described above has various limitations that restrict its utility. When used in dense applications, problems of potential snagging and/or interference exist when engaging or disengaging a connector assembly, due to the top of the flexible arm 36 of the trigger mechanism 35 sitting higher than a top of the adapter body 53. Presence of an apex of the flexible arm 36 of the trigger mechanism 35 proximate to the adapter body 53 may render it awkward to be actuated by some users. The process of reversing polarity using the duplex fiber optic connector assembly 20 may be cumbersome, as it requires removal of the trigger mechanism 35 in a rearward direction over the boot 26 and separate rotation of the individual fiber optic connector subassemblies 10A, 10B relative to the housing 30. Moreover, rotation of the individual fiber optic connector subassemblies 10A, 10B relative to the housing 30 may induce rotational strain in the individual optical fibers 24A, 24B within the cavity 32, as such optical fibers 24A, 24B are rigidly affixed to the ferrules 13A, 13B and mechanically prevented from rotation by the crimp band 25.

Need therefore exists in the art for improved duplex fiber optic connector assemblies and fiber optic cable assemblies incorporating same, to address limitations associated with duplex fiber optic connector assemblies known in the art.

SUMMARY

Aspects of the present disclosure provide a duplex fiber optic connector assembly suitable for polarity reversal, including first and second fiber optic connector subassemblies received by a primary housing that in turn is received by a latch housing. The primary housing is configured to be releasably engaged with the latch housing in either an upwardly-facing or downwardly-facing configuration (e.g., the latch housing is repositionable) for polarity reversal, and the primary housing may be removed from the latch housing by movement of the primary housing in a rearward direction. At least one manually actuatable engagement feature of the primary housing is configured to be received by at least one receiving feature of the latch housing. A manually actuatable latch mechanism of the latch housing is configured to permit releasable engagement between the latch housing and a fiber optic adapter housing separate from the duplex fiber optic connector assembly. The primary housing with the fiber optic connector subassemblies retained therein may be removed from the latch housing while the latch housing remains engaged with a fiber optic adapter housing separate from the duplex fiber optic connector assembly. Polarity may be reversed by removing the primary housing and retained connector subassemblies from the latch housing, flipping the primary housing over relative to the latch housing, and reinserting the primary housing into the latch housing, without requiring the connector subassemblies to be rotated about their longitudinal axes relative to the primary housing. Duplex fiber optic connector assemblies according to certain embodiments may exhibit a reduced maximum height relative to a conventional duplex fiber optic connector assembly according to U.S. Pat. No. 8,152,385.

In one aspect, the disclosure relates to a duplex fiber optic connector assembly suitable for polarity reversal, comprising: a first fiber optic connector subassembly comprising a first ferrule retaining a first optical fiber; a second fiber optic connector subassembly comprising a second ferrule retaining a second optical fiber; a primary housing defining a first aperture and a second aperture for respectively receiving portions of the first and the second fiber optic connector subassemblies such that portions of the first and the second fiber optic connector subassemblies protrude in a forward direction from the primary housing, the primary housing further comprising at least one engagement feature that is manually actuatable; and a latch housing configured to matably receive the primary housing when the primary housing is an a first, upwardly-facing configuration and when the primary housing is in a second, downwardly-facing configuration, the latch housing comprising (i) at least one receiving feature configured to receive the at least engagement feature to permit releasable engagement between the primary housing and the latch housing, and (ii) a latch mechanism that is manually actuatable and configured to permit releasable engagement between the latch housing and a fiber optic adapter housing separate from the duplex fiber optic connector assembly. Upon manual actuation of the at least one engagement feature, the duplex fiber optic connector assembly is configured to permit the primary housing to be removed from the latch housing by movement of the primary housing in a rearward direction that opposes the forward direction.

In certain embodiments, each of the first fiber optic connector subassembly and the second fiber optic assembly is devoid of any latch mechanism configured to mechanically engage the respective first fiber optic connector subassembly or the second fiber optic connector subassembly with a fiber optic adapter housing separate from the duplex fiber optic connector assembly.

In certain embodiments, the latch housing defines a recess configured to receive at least a portion of the primary housing; the recess has a recess height and a recess width; the recess width is greater than a combined width of the first fiber optic connector subassembly and the second fiber optic connector subassembly; the recess height is greater than a maximum height of the first fiber optic connector subassembly; and the recess height is greater than a maximum height of the second fiber optic connector subassembly.

In certain embodiments, the recess of the latch housing is bounded by an upper face and two opposing side walls of the latch housing.

In certain embodiments, the primary housing comprises a base member and a cover member; each of the base member and the cover member define complementary portions of the first aperture; and each of the base member and the cover member define complementary portions of the second aperture.

In certain embodiments, the base member is mechanically coupled with the cover member to enclose a cavity within the primary housing.

In certain embodiments, the cover member comprises a first fiber polarity indicator, the base member comprises a second fiber polarity indicator, and the latch housing defines a window configured to (i) permit the first fiber polarity indicator to be visible when the primary housing is the first, upwardly-facing configuration, and (ii) permit the second fiber polarity indicator to be visible when the primary housing is in the second, downwardly-facing configuration.

In certain embodiments, the at least one engagement feature comprises opposing first and second lateral biasing members, and the at least one receiving feature comprises opposing first and second lateral openings configured to receive respective portions of the first and second lateral biasing members.

In certain embodiments, the primary housing comprises a rear end, and each of the first lateral biasing member and the second lateral biasing member extends forwardly and laterally outwardly from the rear end of the primary housing.

In certain embodiments, the first and second lateral biasing members are configured to be actuated by manually pressing or squeezing the first and second lateral biasing members toward one another, to permit the primary housing to be disengaged from the latch housing.

In certain embodiments, the latch housing comprises a first forwardly-protruding portion configured to be arranged over the first fiber optic connector subassembly, and a second forwardly-protruding portion configured to be arranged over the first fiber optic connector subassembly; and the latch mechanism comprises a first latch member protruding upwardly and rearwardly from the first forwardly-protruding portion, a second latch member protruding upwardly and rearwardly from the second forwardly-protruding portion, and a cross-member connecting rear portions of the first latch member and the second latch member.

In certain embodiments, the first latch member comprises first laterally protruding tab members, and the second latch member comprises second laterally protruding tab members.

In certain embodiments, the first fiber optic connector subassembly comprises a first fiber optic connector body, and first ferrule is forwardly biased by a first spring within the first fiber optic connector body; and the second fiber optic connector subassembly comprises a second fiber optic connector body, and second ferrule is forwardly biased by a second spring within the second fiber optic connector body.

In certain embodiments, the latch mechanism is configured to be pressed or squeezed in a first direction to permit releasable engagement between the latch housing and the fiber optic adapter housing separate from the duplex fiber optic connector assembly; and the at least one engagement feature of the primary housing is configured to be pressed or squeezed in a second direction to permit releasable engagement between the primary housing and the latch housing; wherein the second direction is orthogonal to the first direction.

In another aspect, the disclosure relates to a fiber optic cable assembly being terminated at at least one end with a duplex fiber optic connector assembly as disclosed herein.

In another aspect, the disclosure relates to a method for reversing polarity of a fiber optic cable assembly terminated with a duplex fiber optic connector assembly as disclosed herein.

In another aspect, the disclosure relates to a method for fabricating a fiber optic cable assembly, the method comprising: terminating a first optical fiber in a first ferrule of a first fiber optic connector subassembly; terminating a second optical fiber in a second ferrule of a second fiber optic connector subassembly; receiving a rear portion of the first fiber optic connector subassembly in a first aperture defined in a primary housing of a duplex fiber optic connector assembly such that a front portion of the first fiber optic connector subassembly protrudes from the primary housing in a forward direction, and receiving a rear portion of the second fiber optic connector subassembly in a second aperture defined in the primary housing of the duplex fiber optic connector assembly such that a front portion of the second fiber optic connector subassembly protrudes from the primary housing in the forward direction; and effecting relative movement between the primary housing and a latch housing of the duplex fiber optic connector assembly to cause the primary housing to move forwardly and/or the latch housing to move rearwardly, while causing at least one engagement feature of the primary housing that is manually actuatable to be engaged with at least one receiving feature of the latch housing to permit releasable engagement between the primary housing and the latch housing. The latch housing comprises a latch mechanism that is manually actuatable and configured to permit releasable engagement between the latch housing and a fiber optic adapter housing separate from the duplex fiber optic connector assembly. Upon manual actuation of the at least one engagement feature, the duplex fiber optic connector is configured to permit the primary housing to be removed from the latch housing by movement of the primary housing in a rearward direction that opposes the forward direction.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 6 is an exploded perspective view of a duplex fiber optic connector assembly including a primary housing (composed of a base member and a cover member) configured to receive first and second fiber optic connector subassemblies each devoid of a latch mechanism, and including a latch housing configured to releasably engage the primary housing in either an upwardly-facing or downwardly-facing configuration, according to one embodiment.

DETAILED DESCRIPTION

Figure 1:
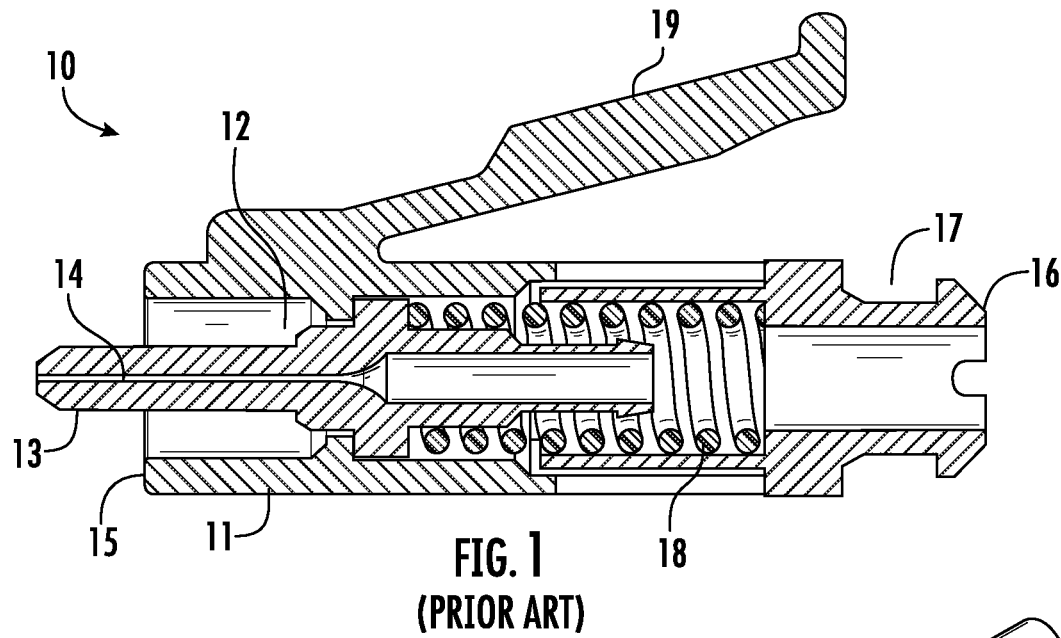
FIG. 1 is a cross-sectional view of a conventional fiber optic connector subassembly including an integrated cantilever-type latch arm and having a ferrule that is forwardly biased by a spring.

Reference is now made in detail to the present preferred embodiments of the disclosure, examples of which are illustrated in the accompanying drawings. Whenever possible, the same or similar reference numerals are used throughout the drawings to refer to the same or similar parts. It should be understood that the embodiments disclosed herein are merely examples, each incorporating certain benefits of the present disclosure. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

The disclosure relates to a duplex fiber optic connector assembly suitable for polarity reversal, including first and second fiber optic connector subassemblies received by a primary housing that in turn is received by a latch housing. The primary housing is configured to be releasably engaged with the latch housing in either an upwardly-facing or downwardly-facing configuration, and the primary housing may be removed from the latch housing by movement of the primary housing in a rearward direction. Polarity may be reversed by removing the primary housing and retained connector subassemblies from the latch housing, flipping the primary housing over relative to the latch housing, and reinserting the primary housing into the latch housing. This configuration permits polarity to be reversed by changing relative orientation between the primary housing and the latch housing, without requiring individual rotation of the first and second fiber optic connector subassemblies about longitudinal axes thereof relative to the primary housing. At least one manually actuatable engagement feature of the primary housing is configured to be received by at least one receiving feature of the latch housing. A manually actuatable latch mechanism of the latch housing is configured to permit releasable engagement between the latch housing and a fiber optic adapter housing separate from the duplex fiber optic connector assembly. The primary housing with the fiber optic connector subassemblies retained therein may be removed from the latch housing while the latch housing remains engaged with a fiber optic adapter housing separate from the duplex fiber optic connector assembly.

Figure 3:
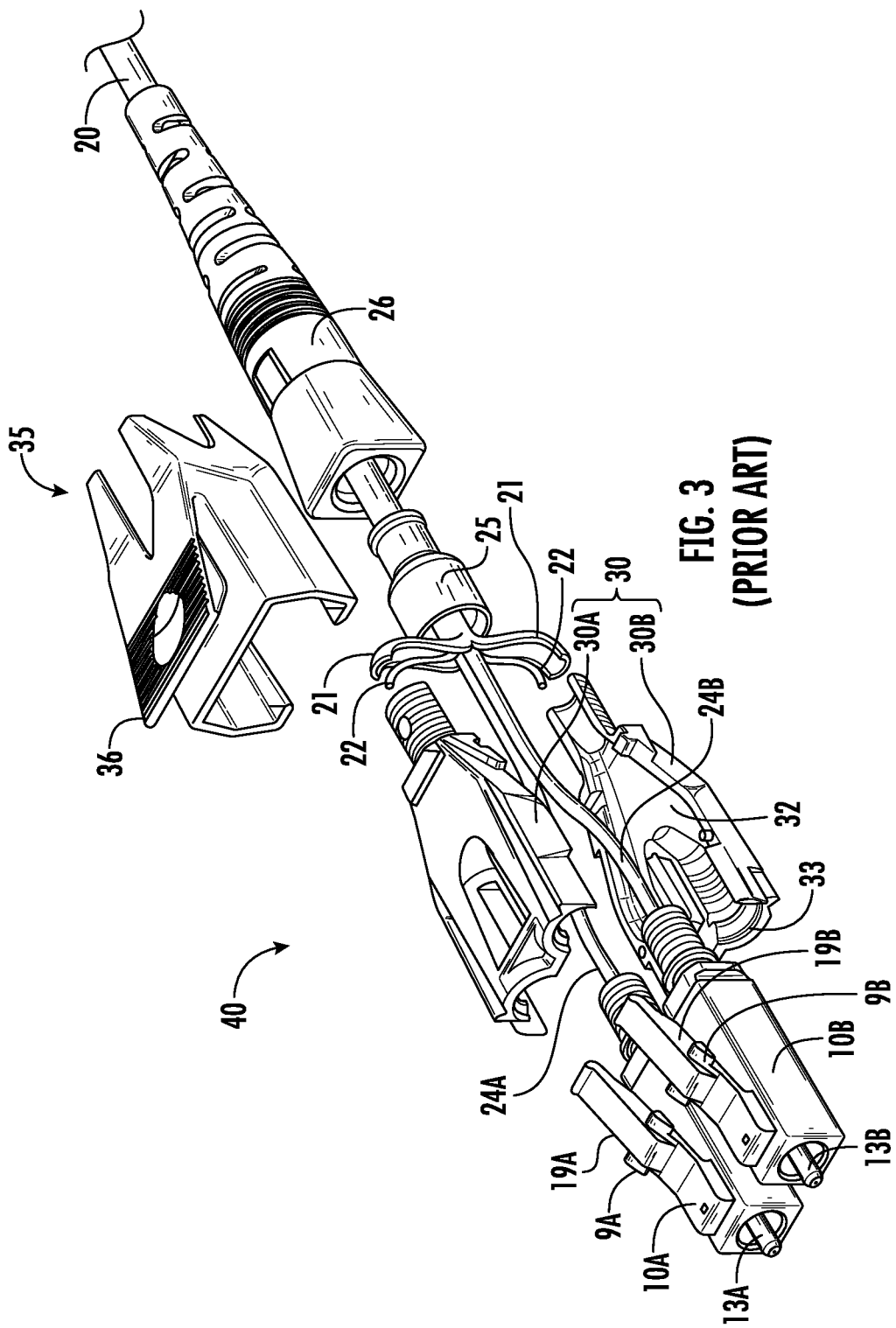
FIG. 3 is a partially exploded perspective view of the conventional duplex fiber optic connector assembly of FIG. 2.

FIGS. 6 and 7A-7E show a duplex fiber optic connector assembly 100 according to one embodiment of the present disclosure, including a primary housing (composed of a base member 130A and a cover member 130B, which in combination may be referred to hereinafter as primary housing 130) configured to receive first and second fiber optic connector subassemblies 110A, 110B, and including a latch housing 150 configured to releasably engage the primary housing 130 in either an upwardly-facing or downwardly-facing configuration. FIG. 6 provides an exploded perspective view, while FIGS. 7A-7E provided various views of the duplex fiber optic connector assembly 100 in assembled form. In contrast to the fiber optic connector assembly 10 shown in FIG. 1 (as well as the fiber optic connector assemblies 10A, 10B shown in FIG. 3), the first and second fiber optic connector subassemblies 110A, 110B shown in FIG. 6 are each devoid of a latch mechanism (19 in FIG. 1) for coupling with fiber optic adapter housing (e.g., 50 in FIG. 4). However, the first and second fiber optic connector subassemblies 110A, 110B are otherwise similar in structure and function to the fiber optic connector subassemblies 10 (in FIG. 1) and 10A-10B (in FIG. 3) in terms of having a rectangular body structure 111A, 111B with a ferrule 113A, 113B spring-biased in a forward direction to protrude from a front end 115A, 115B of each subassembly 110A, 110B, and having an annular recess 117A, 117B proximate to a rear end 116A, 116B thereof.

With continued reference to FIG. 6, the base member 130A includes a front portion 146A, a rear portion 147A that is narrower than the front portion 146A, a front end 131A defining two front aperture portions 133A, and a rear end 132A defining one rear aperture portion 143A, with an internal cavity 134A extending from the front end 131A to the rear end 132A. The front end 131A includes a front tab 136 having a front clasp element 136' at a tip thereof, and an outer surface 135A of the base member 130A defines recesses 139 along the rear portion 147A, wherein the front clasp element 136' and the recesses 139 are configured to permit mechanical coupling between the base member 130A and the cover member 130B. The outer surface 135A includes a fiber polarity indicator (145A in FIG. 8B). Texturing 144A may be provided on part of the outer surface 135A proximate to the rear end 132A to increase friction and reduce slipping when grasped by fingers of a user.

The cover member 130B has a shape complementary to that of the base member 130A, with a front portion 146B, a rear portion 147B that is narrower than the front portion 146B, a front end 131B defining two front aperture portions 133B, and a rear end 132B defining one rear aperture portion (143B in FIG. 9A), with an internal cavity (134B in FIG. 9A) extending from the front end 131B to the rear end 132B. First and second lateral biasing members 141, which serve as engagement members to permit releasable engagement with the latch housing 150, extend forwardly and laterally outwardly from the rear end 132B of the cover member 130B, and may include textured surfaces 142 thereon and clasp elements 141' at tips thereof. The lateral biasing members 141 extend from the narrow rear portion 147 outwardly to have a width between tips thereof that exceeds a width of the front portion 146B. The front end 131B of the cover member 130B includes a front recess 137 and a top recess 137' configured to receive the front tab 136 and the front clasp elements 136', respectively, of the base member 130A. The rear portion 147B defines medial tabs 138 having clasp elements (138' in FIG. 9A) at tips thereof that are configured to be received by the recesses 139 defined in the outer surface 135A of the base member 130A. An outer surface 135B of the cover member 130B includes a fiber polarity indicator 145 over the front portion 146B, and may include texturing 144B proximate to the rear end 132B. The front aperture portions 133A, 133B of the base member 130A and cover member 130B, respectively, are configured to form apertures for receiving the annular recesses 117A, 117B of the first and second fiber optic connector subassemblies 110A, 110B when the base member 130A and cover member 130B are mechanically coupled together. The rear aperture portions 143A, 143B of the base member 130A and cover member 130B, respectively, are likewise configured to form a single aperture to permit passage of an inner crimp band 129 with optical fibers (not shown) passing therethrough, so that a forward portion of the inner crimp band 129 may be retained in the cavities 134A, 135B ahead of the rear ends 132A, 132B of the base member 130A and the cover member 130B, respectively. An outer crimp band 125 and a boot 126 may be sequentially arranged over the inner crimp band 129 to provide further protection to a fiber optic cable (not shown) from which optical fibers to be terminated may emanate.

With continued reference to FIG. 6, the latch housing 150 has an upper face 153 defining a window 154, side walls 155 defining latch apertures 158 (embodying receiving features for receiving clasp elements 141' of the lateral biasing members 141 of cover member 130B), and lower face portions 157. A recess 168 arranged between the upper face 153, the side walls 155, and the lower face portions 157 is configured to receive the primary housing 130 (composed of the base member 130A coupled to the cover member 130B). The upper face 153 of the latch housing 150 includes two forwardly-protruding portions 160 that terminate at a front end 151, which opposes a rear end 152 of the latch housing 150. First and second latch members 161 protrude upwardly and rearwardly from the forwardly-protruding portions 160, with each latch member 161 having laterally protruding tab members 162, and with rear portions of the latch members 161 being connected by a cross-member 163 having a textured surface 164. If the cross-member 163 is pressed downward by a user, this will cause the latch members 161 to flex and lower a vertical position of the laterally protruding tab members 162, thereby permitting the laterally protruding tab members 162 to be disengaged from mating features (e.g., medial projections 59A, 59B of FIG. 4) of an adapter housing (50 in FIG. 4).

The duplex fiber optic connector assembly 100 may be used to terminate various types of duplex fiber optic cables. By way of example, the duplex fiber optic connector assembly 100 may be used to terminate a fiber optic cable (e.g., fiber optic cable 20 in FIG. 3) that includes two unbuffered optical fibers (e.g., 24A, 24B in FIG. 3) generally surrounded by one or more strength elements (e.g., 22 in FIG. 3) and a cable jacket (e.g., 21 in FIG. 3); however, other fiber optic cable variations may include buffered optical fibers and/or eliminate the strength elements or jacket. During fabrication of the duplex fiber optic connector assembly 100, stripped optical fibers (e.g., 24A, 24B in FIG. 3) of a fiber optic cable (e.g., 20 in FIG. 3) may be terminated in the ferrules 113A, 113B of the first and second connector subassemblies 110A, 110B, which may be received by the front aperture portions 133A of the base member 130A. Optical fibers of a may be routed rearward through the internal cavity 134A toward the rear aperture portion 143A. The inner crimp band 129 of FIG. 6 may be crimped over a portion of the fiber optic cable, and a forward portion of the inner crimp band 129 may be positioned ahead of the rear aperture portion 143A within the internal cavity 134A. Thereafter, the cover member 130B may be fitted over the first and second connector subassemblies 110A, 110B (with annular recesses 117A, 117B at rear portions of the connector subassemblies 110A, 110B received by the front aperture portions 133A, 133B) and over the base member 130A. The front tab 136 and front clasp element 136' of the base member 130A are received by the front recess 137 and a top recess 137' of the cover member 130B, respectively, while the clasp elements (138' in FIG. 9A) of the cover member 130B are received by recesses 139 defined in the outer surface 135A of the base member 130A, to mechanically couple the cover member 130B and base member 130A to one another to form a primary housing 130, with front portions of the connector subassemblies 110A, 110B protruding in a forward direction from a front of the primary housing 130.

Figure 2:
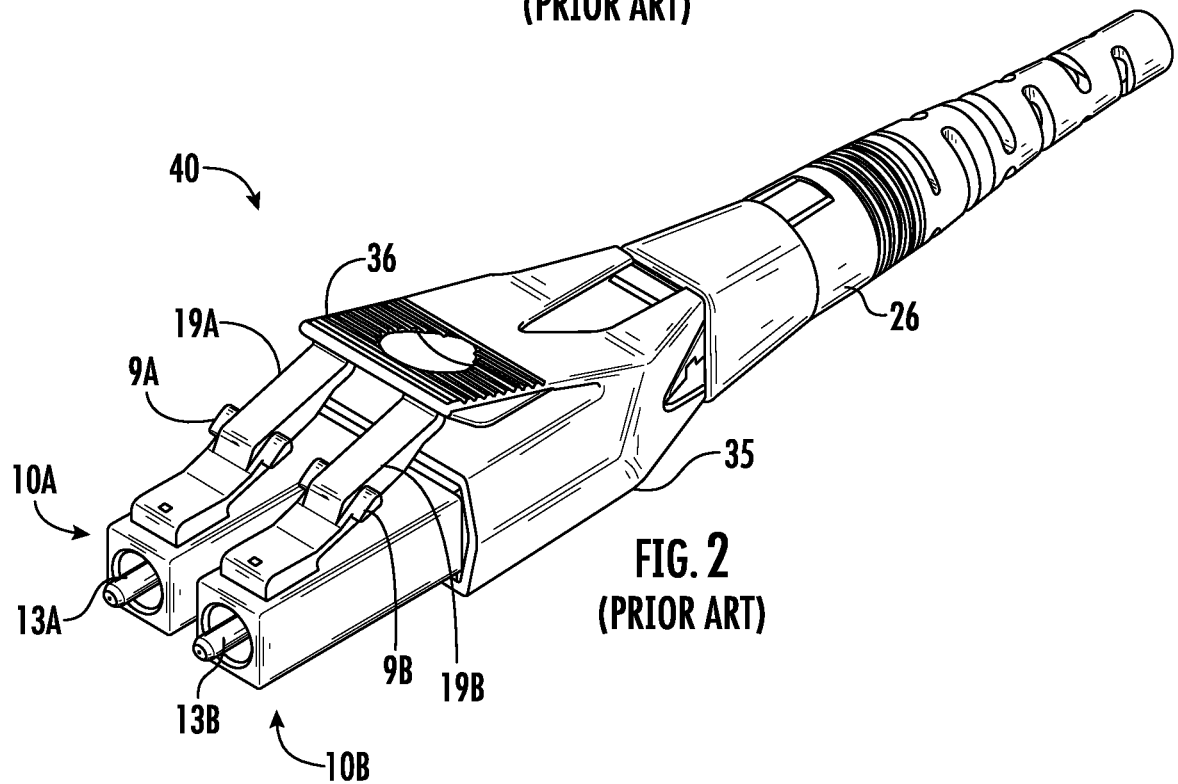
FIG. 2 is a perspective view of a conventional duplex fiber optic connector assembly incorporating first and second fiber optic connector subassemblies of a type according to FIG. 1, and including a removable trigger mechanism having a flexible arm that contacts the latch arms of the first and second fiber optic connector subassemblies, according to U.S. Pat. No. 8,152,385.

Following fabrication of the primary housing 130, the latch housing 150 may be fitted over the primary housing 130 by movement of the primary housing 130 forwardly into the recess 168 of the latch housing 150, and/or by movement of the latch housing 150 rearward over a front portion of the primary housing 130, resulting in positioning of the forwardly-protruding portions 160 of the latch housing 150 over the first and second fiber optic connector subassemblies 110A, 110B, until the lateral biasing members 141 cause the clasp elements 141' (embodying engagement features) of the primary housing 130 to be received by the latch apertures 158 (embodying receiving features) of the latch housing 150. Movement of the latch housing 150 in a rearward direction over a front of the base housing 130 is enabled by the fact that the first and second fiber optic connector subassemblies 110A, 110B are devoid of latch members (in contrast to the first and second fiber optic connector subassemblies 10A, 10B of FIG. 2), and the first and second connector subassemblies 110A, 110B have an aggregate width smaller than a width of the recess 168 (between side walls 155) of the latch housing, and the first and second connector subassemblies 110A, 110B each have a maximum height ($h_1$ in FIG. 7A) smaller than a height ($h_2$ in FIG. 10B) of the recess 168. If desired, the primary housing 130 may be disengaged from the latch housing 150 by manually squeezing or pressing the lateral biasing members 141 toward one another and moving the primary housing 130 rearwardly to withdraw the latch housing 150 and then the first and second fiber optic connector subassemblies 110A, 110B though the recess 168 of the latch housing 150.

Figure 7A:
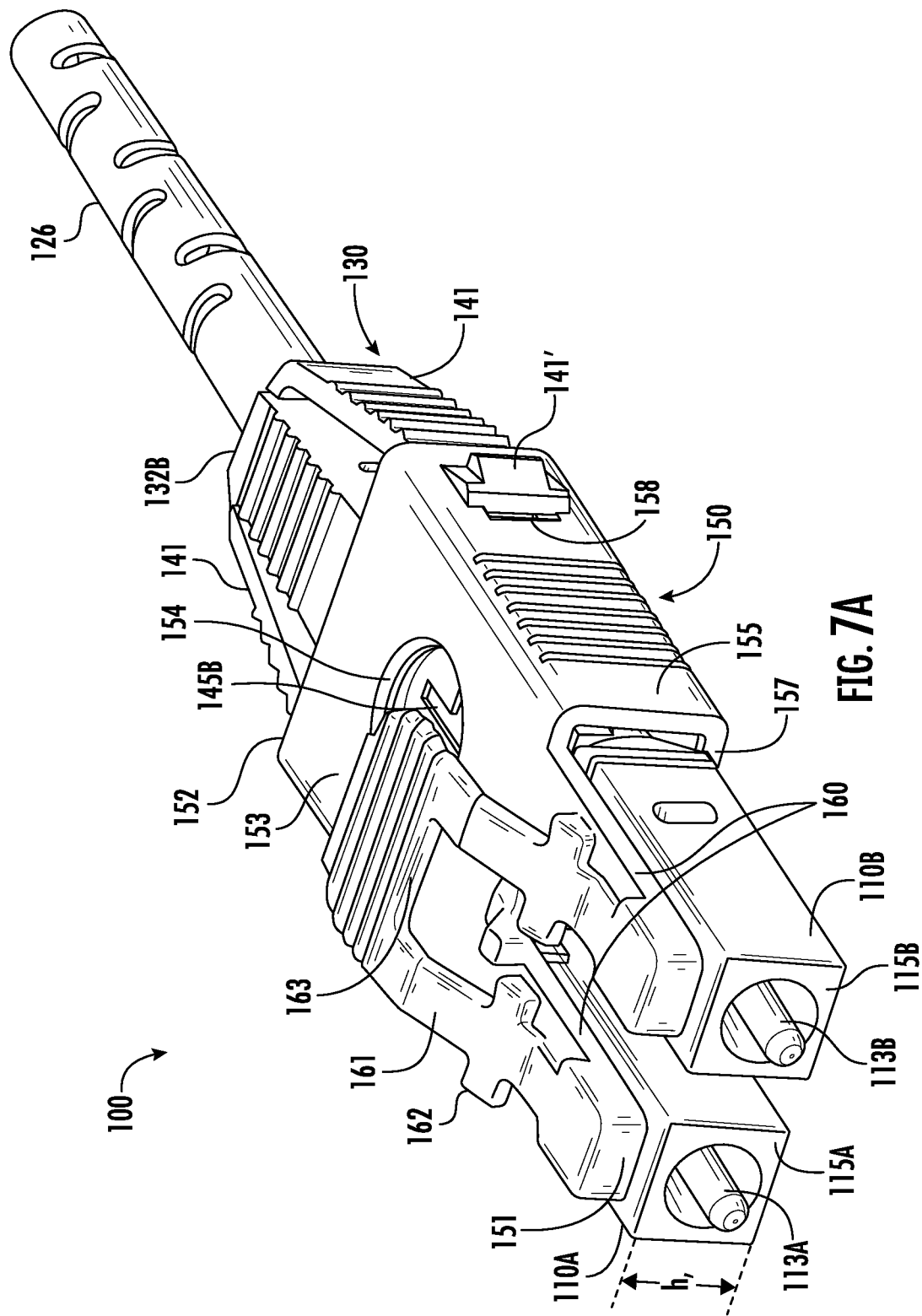
FIG. 7A is a perspective view of the duplex fiber optic connector assembly of FIG. 6 in assembled form.
Figure 7B:
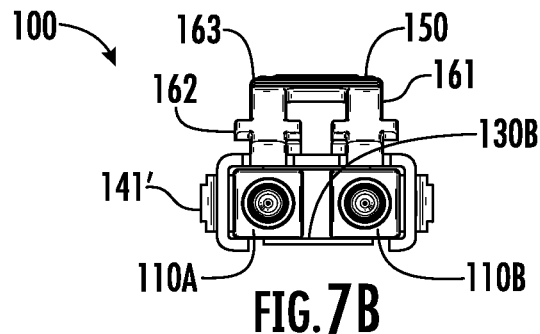
FIG. 7B is a front elevational view of the duplex fiber optic connector assembly of FIG. 7A.
Figure 7C:
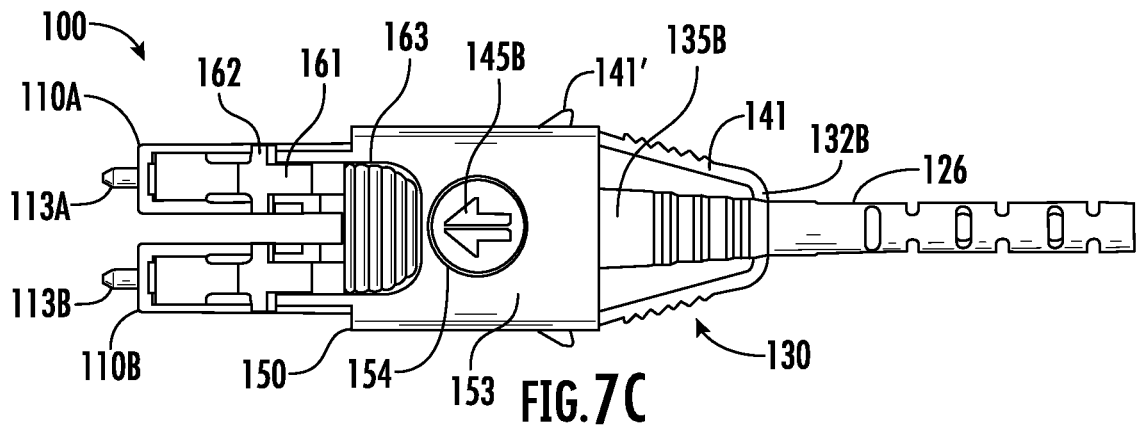
FIG. 7C is a top plan view of the duplex fiber optic connector assembly of FIG. 7A.
Figure 7D:
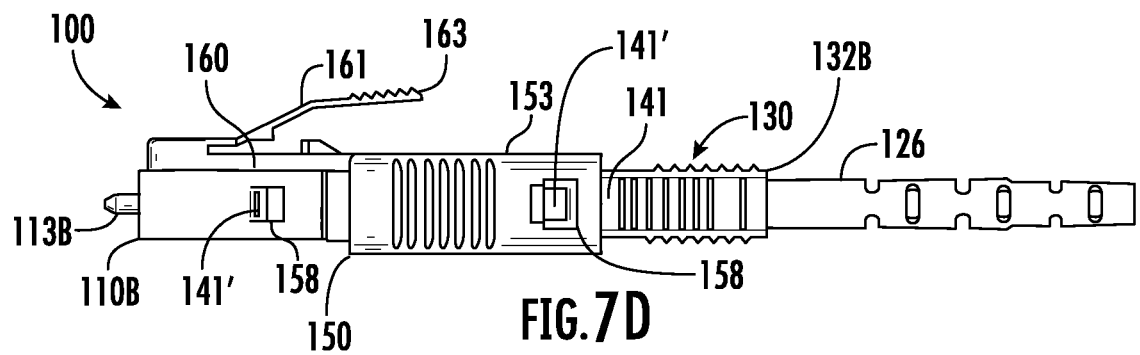
FIG. 7D is a side elevational view of the duplex fiber optic connector assembly of FIG. 7A.
Figure 7E:
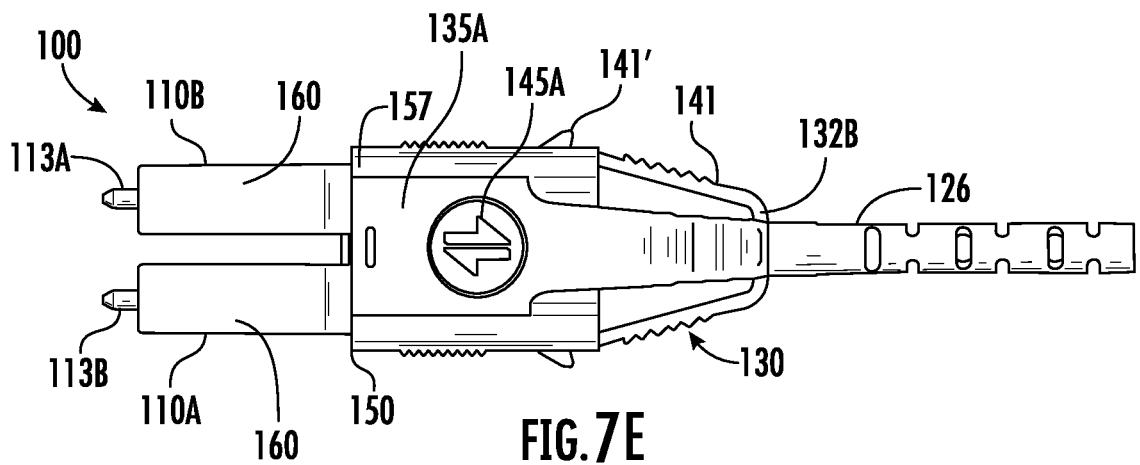
FIG. 7E is a bottom plan view of the duplex fiber optic connector assembly of FIG. 7A.

FIG. 7A is a perspective view of the duplex fiber optic connector assembly 100 in assembled form, showing the fiber optic polarity indicator 145B of the cover member 130B (of FIG. 6, as part of the primary housing 130 in FIG. 7A) as being visible through the window 154 defined in the latch housing 150. FIG. 7A also shows a clasp element 141 at a tip of a lateral biasing member 141 as being received by a latch aperture 158 of the latch housing 150. The forwardly-protruding portions 160 of the latch housing 150 extend over the first and second fiber optic connector subassemblies 110A, 110B, with front ends 115A, 115B of the first and second fiber optic connector subassemblies 110A, 110B and ferrules 113A, 113B thereof extending slightly forward relative to a front end 151 of the latch housing 150. FIGS. 7B to 7E provide front elevational, top plan, side elevational, and bottom plan views, respectively of the duplex fiber optic connector assembly 100. As shown in FIG. 7E, the outer surface 135A of the base member of the primary housing 130 includes a fiber polarity indicator 145A that differs from the fiber polarity indicator 145B provided on the outer surface 135B of the cover member of the primary housing 130. All elements shown in FIGS. 7A-7E have been described previously in connection with FIG. 6.

Figure 8A:
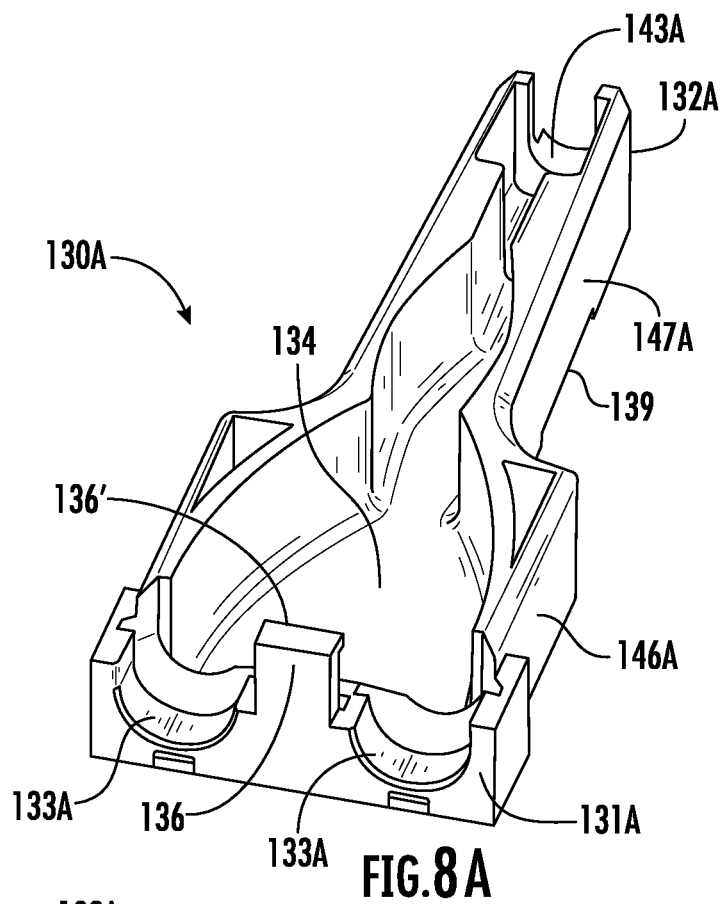
FIG. 8A is a first perspective view showing an interior of the base member of the primary housing of the duplex fiber optic connector assembly of FIG. 6.
Figure 8B:
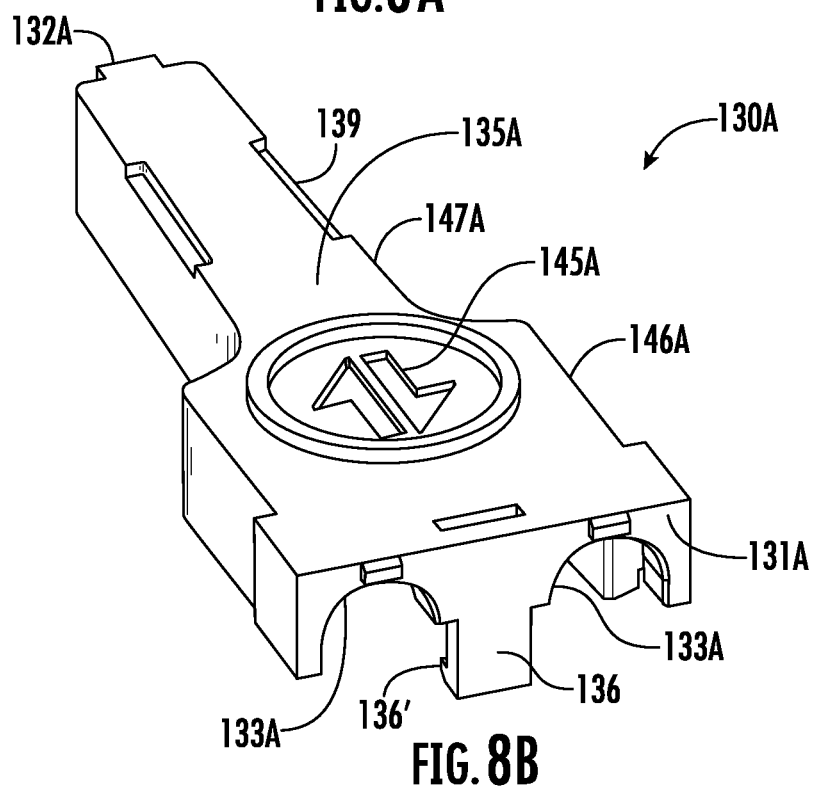
FIG. 8B is a second perspective view showing an exterior of the base member of FIG. 8A.

FIGS. 8A-8B provide first and second perspective views of the base member 130A of the duplex fiber optic connector assembly 100 of FIGS. 6 and 7A-7E. As shown, the base member 130A includes the front portion 146A, the rear portion 147A, two front aperture portions 133A defined in the front end 131A, and one rear aperture portion 143A defined in the rear end 132A, as well as an internal cavity 134A. The front end 131A includes the front tab 136 having the front clasp element 136' at a tip thereof, and recesses 139 are defined by the rear portion 147A.

Figure 9A:
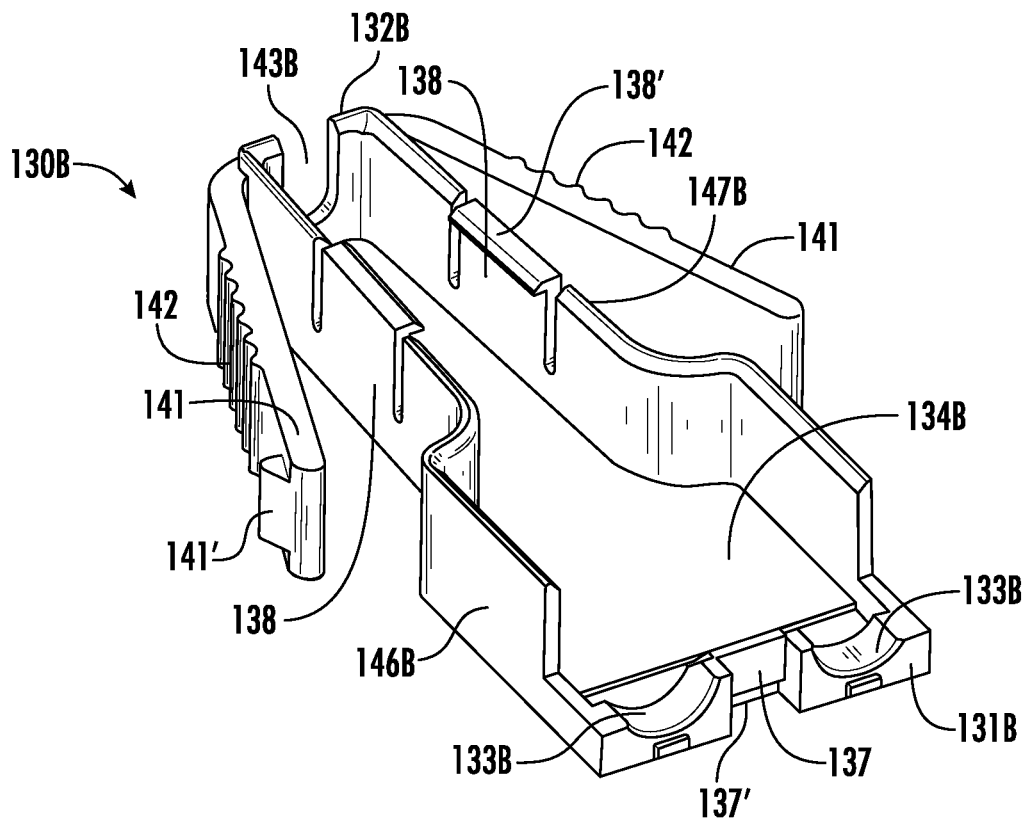
FIG. 9A is a first perspective view showing an interior of the cover member of the primary housing of the duplex fiber optic connector assembly of FIG. 6.
Figure 9B:
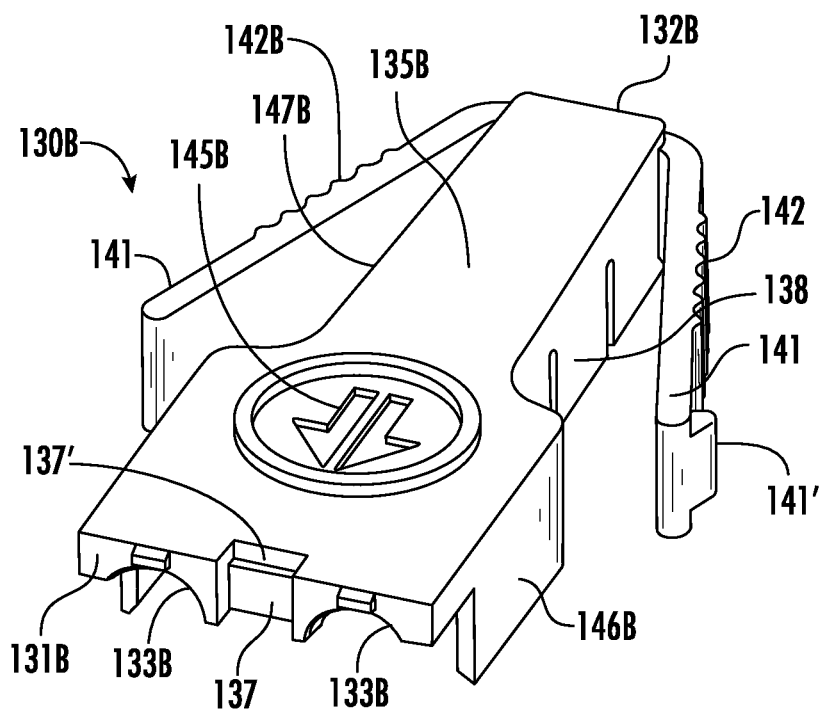
FIG. 9B is a second perspective view showing an exterior of the cover member of FIG. 9A.

FIGS. 9A-9B provide first and second perspective views of the cover member 130B of the duplex fiber optic connector assembly 100 of FIGS. 6 and 7A-7E. As shown, the cover member 130B includes the front portion 146B, the rear portion 147B, two front aperture portions 133B defined in the front end 131B, and one rear aperture portion 143B defined in the rear end 132B, as well as an internal cavity 134B. The rear portion 147B defines medial tabs 138 having clasp elements 138' at tips thereof, and front recess 137 and top recess 137' are provided along the front end 131B of the cover member 130B. First and second lateral biasing members 141, with clasp members 141' at tips thereof, extend forwardly and laterally outwardly from the rear end 132B of the cover member 130B.

Figure 10A:
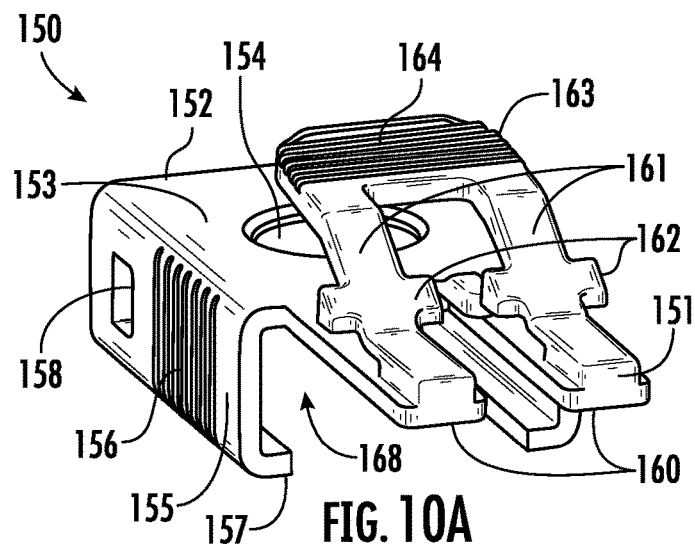
FIG. 10A is a front perspective view showing the latch housing of the duplex fiber optic connector assembly of FIG. 6.
Figure 10B:
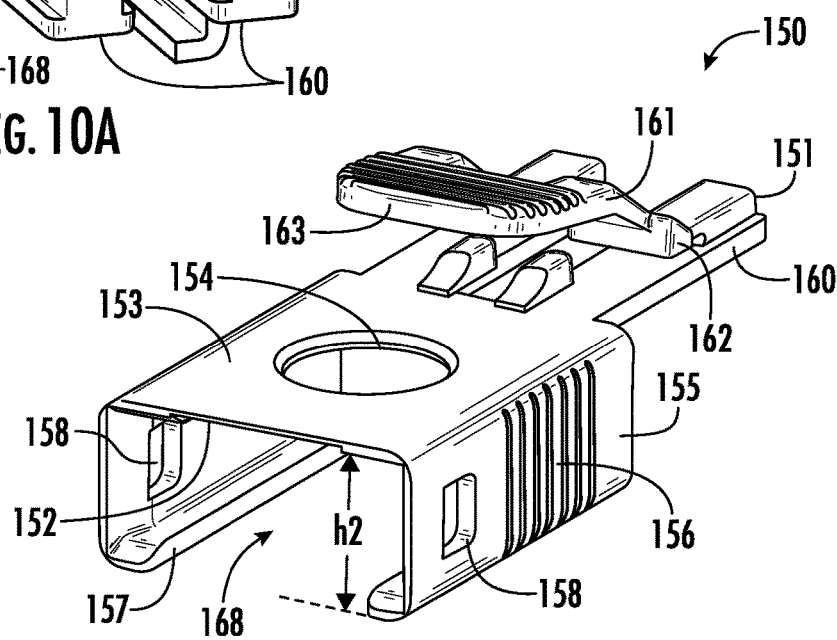
FIG. 10B is a rear perspective view showing the latch housing of FIG. 10A.
Figure 10C:
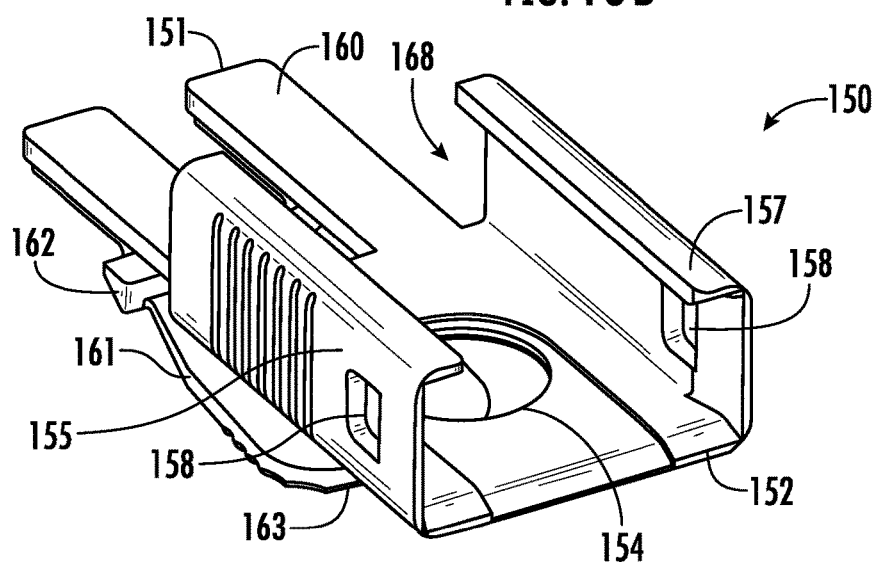
FIG. 10C is a perspective view of an underside of the latch housing of FIG. 10A.

FIGS. 10A-10C provide first to third perspective views of the latch housing 150 of the duplex fiber optic connector assembly 100 of FIGS. 6 and 7A-7E. As shown, the latch housing 150 has an upper face 153 defining a window 154, side walls 155 defining latch apertures 158, and lower face portions 157, with a recess 168 being arranged between the upper face 153, the side walls 155, and the lower face portions 157. The upper face 153 of the latch housing 150 includes two forwardly-protruding portions 160, with first and second latch members 161 protruding upwardly and rearwardly from the forwardly-protruding portions 160. Each latch member 161 has laterally protruding tab members 162, and with rear portions of the latch members 161 being connected by a cross-member 163 having a textured surface 164.

In certain embodiments, each of the base member 130A, the cover member 130B, and the latch member 150 may comprise a unitary member formed by molding (e.g., injection molding) or another suitable process, of a polymeric material that is optionally reinforced with fibers and/or other strength-enhancing additives.

Figure 11A:
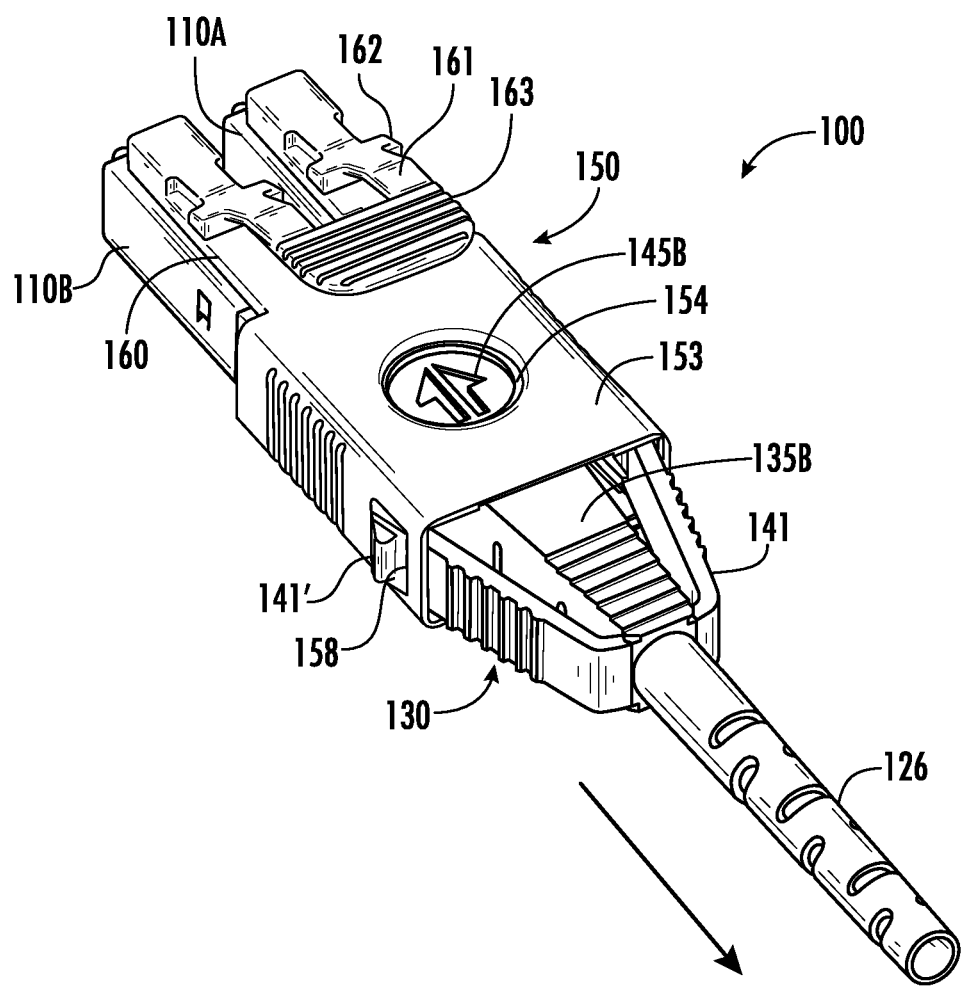
FIG. 11A is a perspective view of the duplex fiber optic connector assembly of FIG. 6 in a first state as part of a polarity reversal operation, prior to removal of the primary housing and retained first and second fiber optic connector subassemblies from the latch housing.
Figure 11B:
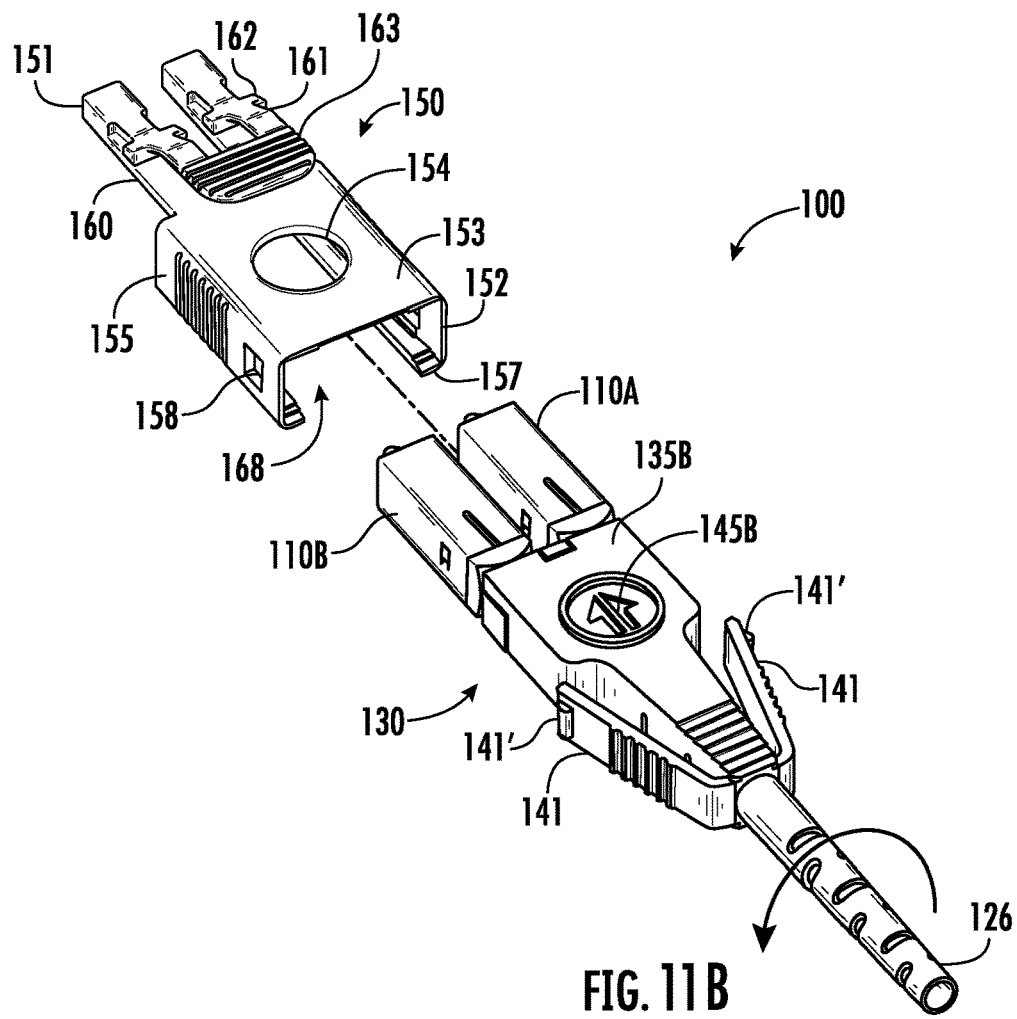
FIG. 11B is a perspective view of the duplex fiber optic connector assembly of FIG. 6 in a second state as part of a polarity reversal operation, following removal from the latch housing of the primary housing and the retained first and second fiber optic connector subassemblies.
Figure 11C:
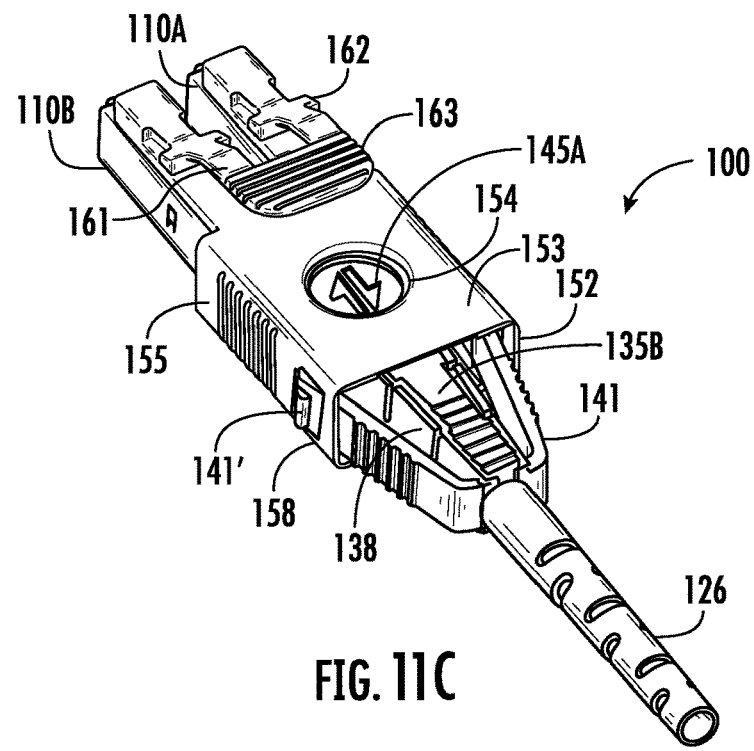
FIG. 11C is a perspective view of the duplex fiber optic connector assembly of FIG. 6 in a third state as part of a polarity reversal operation, following rotation by 180 degrees of the primary housing and the retained first and second fiber optic connector subassemblies about a longitudinal axis of the primary housing.
Figure 11D:
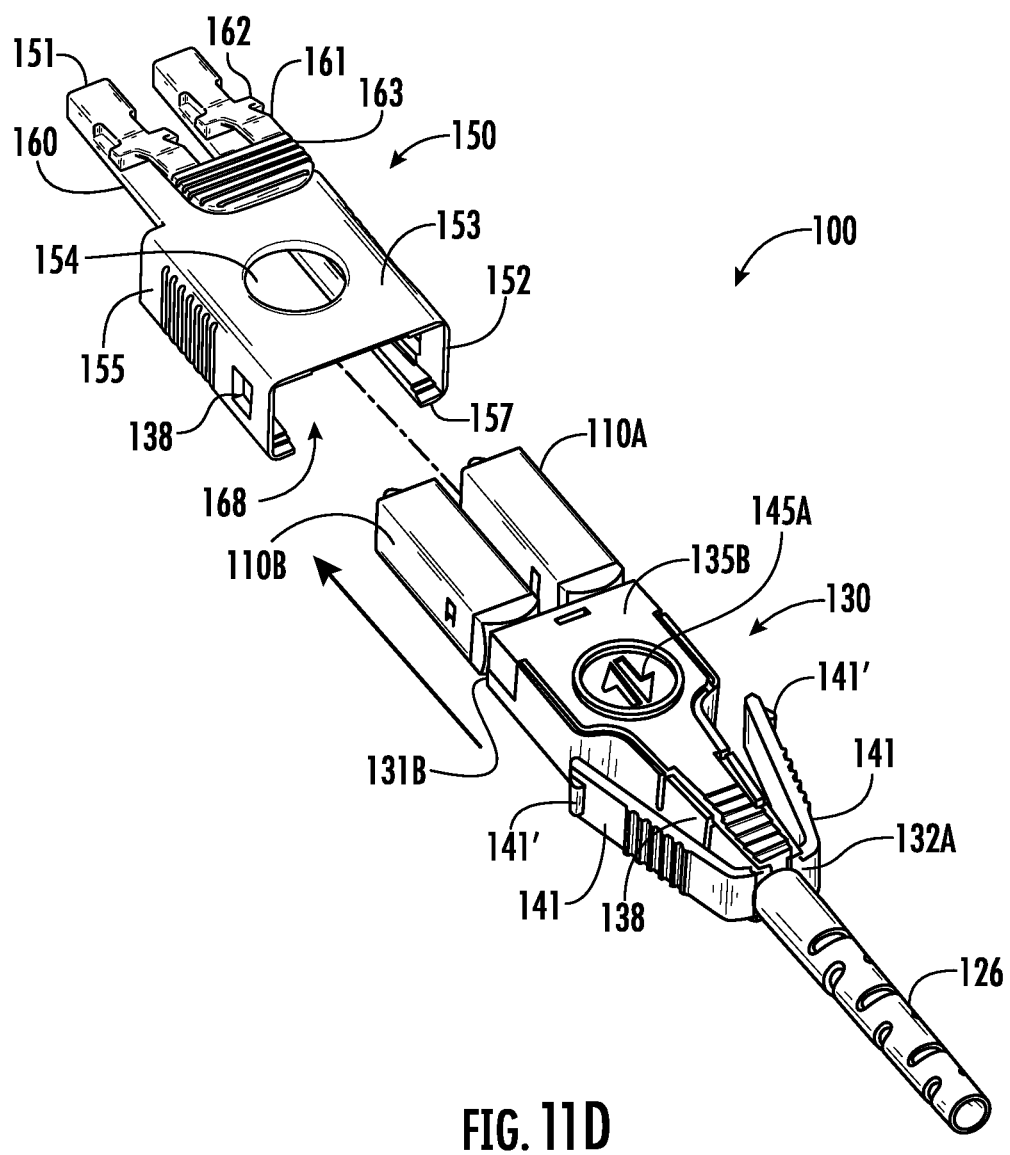
FIG. 11D is a perspective view of the duplex fiber optic connector assembly of FIG. 6 in a fourth state as part of a polarity reversal operation, following reinsertion into the latch housing of the primary housing and retained first and second fiber optic connector subassemblies.

FIGS. 11A-11D illustrate the duplex fiber optic connector assembly 100 of FIG. 6 in various state as part of a polarity reversal operation. FIG. 11A illustrates the duplex fiber optic connector assembly 100 in a first state, with the primary housing 130 received in the latch housing 150, just before the lateral biasing members 141 are pressed toward one another to release the clasp elements 141' from the latch apertures 158, to mechanically disengage the primary housing 130 from the latch housing 150 and permit the primary housing 130 to be moved in a rearward direction (e.g., by pulling) relative to the latch housing 150. As shown in FIG. 11A, the fiber optic polarity indicator 145B of the cover member of the primary housing 130 is visible through the window 154 defined by the latch housing 150. FIG. 11B illustrates the duplex fiber optic connector assembly 100 in a second state, following removal of the primary housing 130 (with the first and second connector subassemblies 110A, 110B retained therein) from the latch housing 150, prior to rotation of the primary housing 130 about a longitudinal axis thereof, with the fiber optic polarity indicator 145B along the outer surface 135B of the cover member of the primary housing 130 facing upward. FIG. 11C illustrates the duplex fiber optic connector assembly 100 in a third state, following rotation of the of the primary housing 130 about a longitudinal axis thereof, with a different fiber optic polarity indicator 145A along the outer surface 135A of the base member of the primary housing 130 facing upward, prior to insertion of the first and second fiber optic subassemblies 110, 110B and primary housing 130 into the recess 168 from the rear end 152 toward the front end 151 of the latch housing 150. FIG. 11D illustrates the duplex fiber optic connector assembly 100 in a fourth state, following movement of the primary housing 130 forwardly into the recess 168 of the latch housing 150, with clasp members 141' at tips of the lateral biasing members 141 of the primary housing 130 received by latch apertures 158 of the latch housing 150, thereby engaging the primary housing 130 with the latch housing 150. As shown, the fiber optic polarity indicator 145A is visible through the window 154 defined by the latch housing 150, signifying that polarity of the optical fibers retained within ferrules of the first and second fiber optic subassemblies 110A, 110B is reversed relative to the fiber polarity that existed in the first state shown in FIG. 11A. Such polarity reversal is performed without requiring the first and second fiber optic subassemblies 110A, 110B to be individually rotated relative to the primary housing 130, thereby promoting a simple polarity reversal process and avoiding torsional stress of individual fibers within the primary housing 130.

Figure 4:
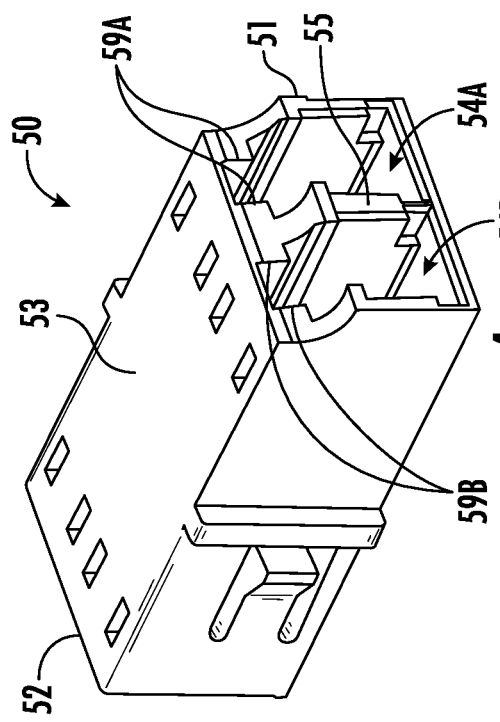
FIG. 4 is a perspective view of a conventional duplex fiber optic adapter housing configured to receive the conventional duplex fiber optic connector assembly of FIG. 2.
Figure 5:
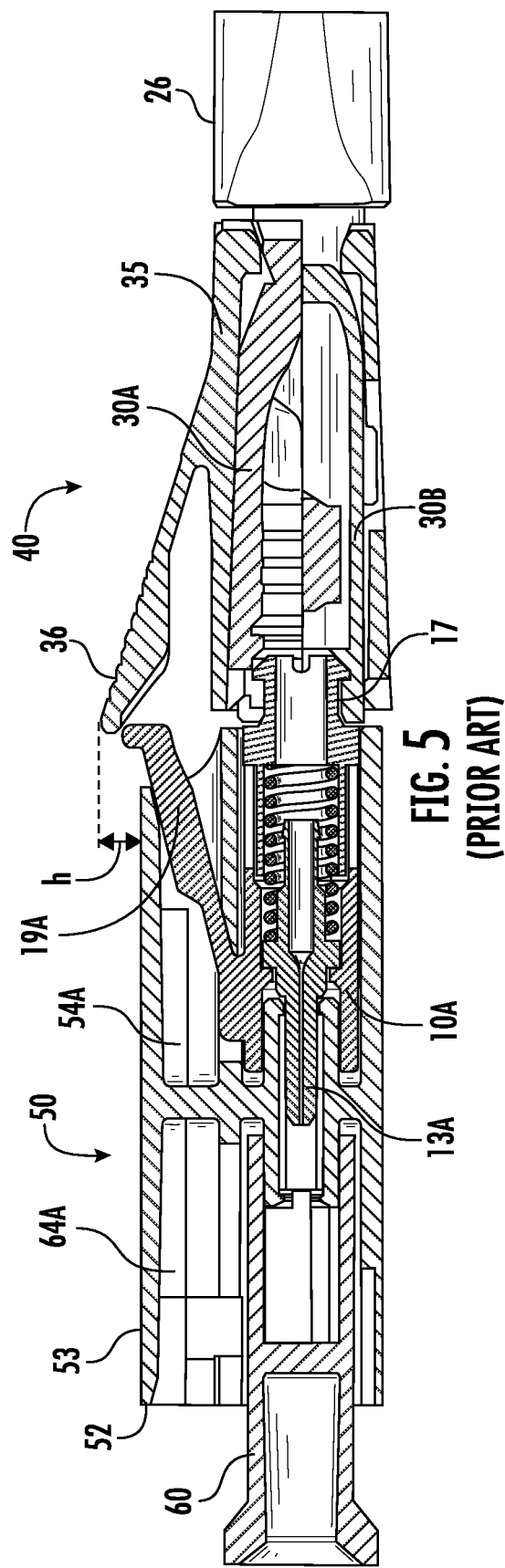
FIG. 5 is a cross-sectional view of the conventional duplex fiber optic connector assembly of FIG. 2 received by the conventional duplex fiber optic adapter housing of FIG. 4.
Figure 12A:
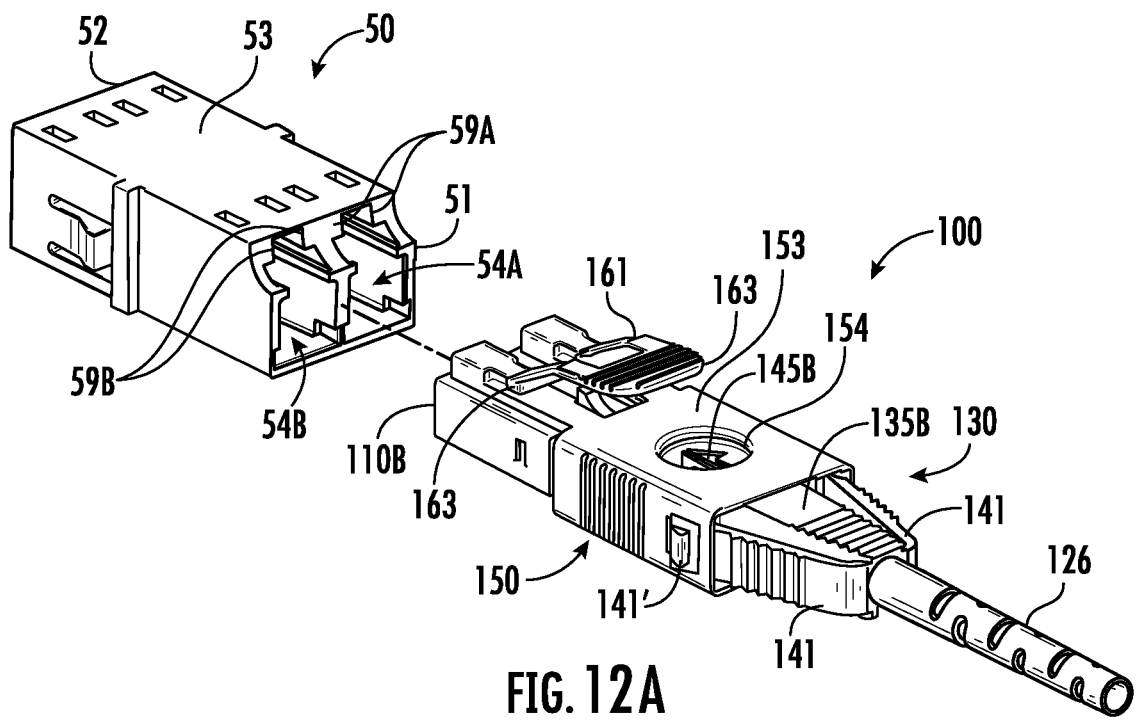
FIG. 12A is a perspective view of the duplex fiber optic connector assembly of FIG. 6 and the adapter housing of FIG. 4 prior to insertion of the duplex fiber optic connector assembly into the adapter housing.
Figure 12B:
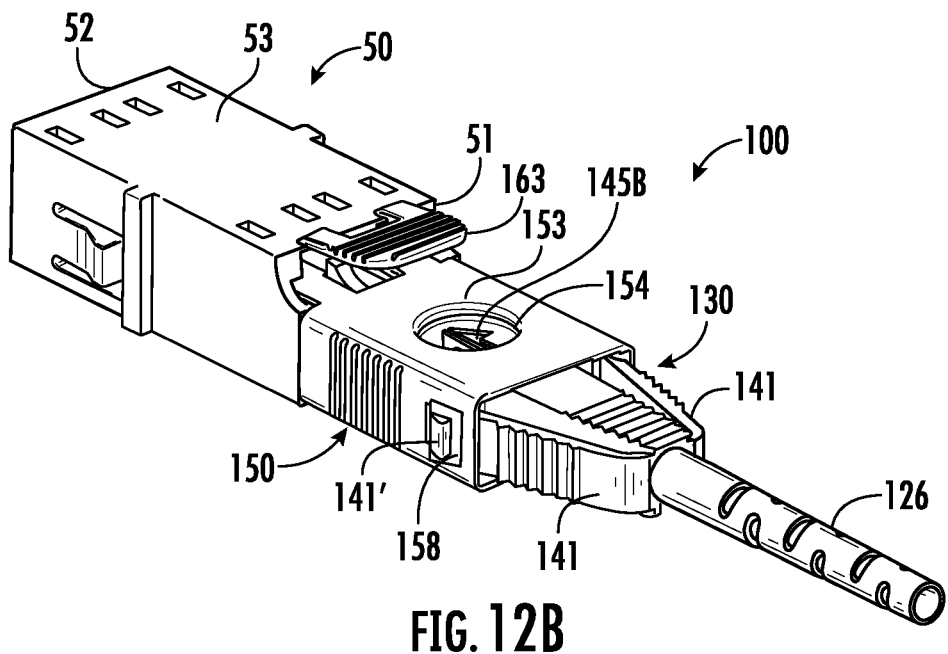
FIG. 12B is a perspective view of the duplex fiber optic connector assembly of FIG. 12A following insertion thereof into the adapter housing.
Figure 12C:
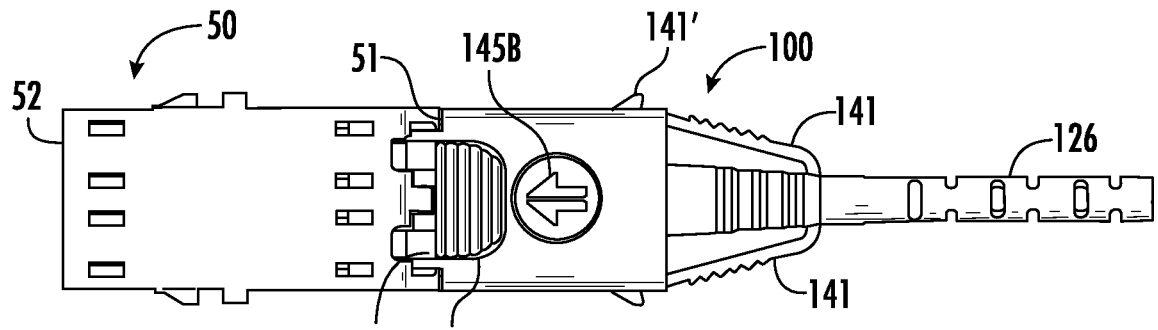
FIG. 12C is a top plan view of the duplex fiber optic connector assembly of FIG. 12A following insertion thereof into the adapter housing.
Figure 12D:
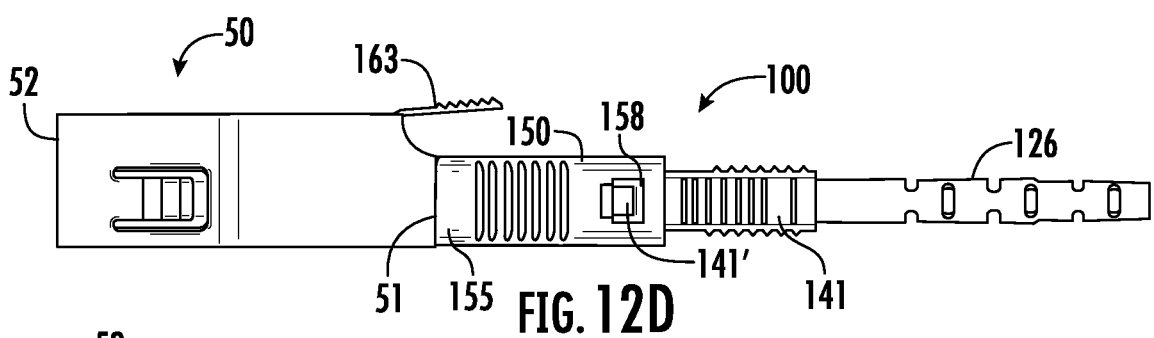
FIG. 12D is a side elevational view of the duplex fiber optic connector assembly of FIG. 12A following insertion thereof into the adapter housing.

FIG. 12A illustrates the duplex fiber optic connector assembly 100 and the adapter housing 50 of FIG. 4 prior to insertion of the duplex fiber optic connector assembly 100 into the adapter housing 50. As shown, the adapter housing 50 has a unitary body 53 that includes a first end 51 defining first and second receiving cavities 54A, 54B, which are separated by a vertical wall 55 that extends from the first end 51 to a second end 52. An upper portion of each receiving cavity 54A, 54B has medial projections 59A, 59B configured to cooperate with the laterally-protruding tab members 162 of the latch arms 161 of the duplex fiber optic connector assembly 100 to provide releasable engagement between the duplex fiber optic connector assembly 100 and the adapter housing 50. FIGS. 12B-12C provided perspective, top plan, and side elevational views of the duplex fiber optic connector assembly 100 being received by and coupled to the adapter housing 50, with the first and second fiber optic connector subassemblies 110A, 110B received by the first and second receiving cavities 54A, 54B, respectively. As shown, the primary housing 130 is releasably engaged with the latch housing 150, and the latch housing 150 is releasably engaged with the adapter housing, such that the latch housing 150 is intermediately arranged between the adapter housing 50 and the primary housing 130. Referring to FIG. 12D, when the latch arms 161 are received by the receiving cavities 54A, 54B, the cross-member 163 may be arranged coplanar, or nearly coplanar, with a top of the unitary body 53 of the adapter housing 50. This may beneficially permit the multiple adapter housings 50 to be vertically stacked in contact (or nearly in contact) with one another in a high density configuration, with each adapter housing 50 permitted to receive a corresponding duplex fiber optic connector assembly 100.

Figure 13:
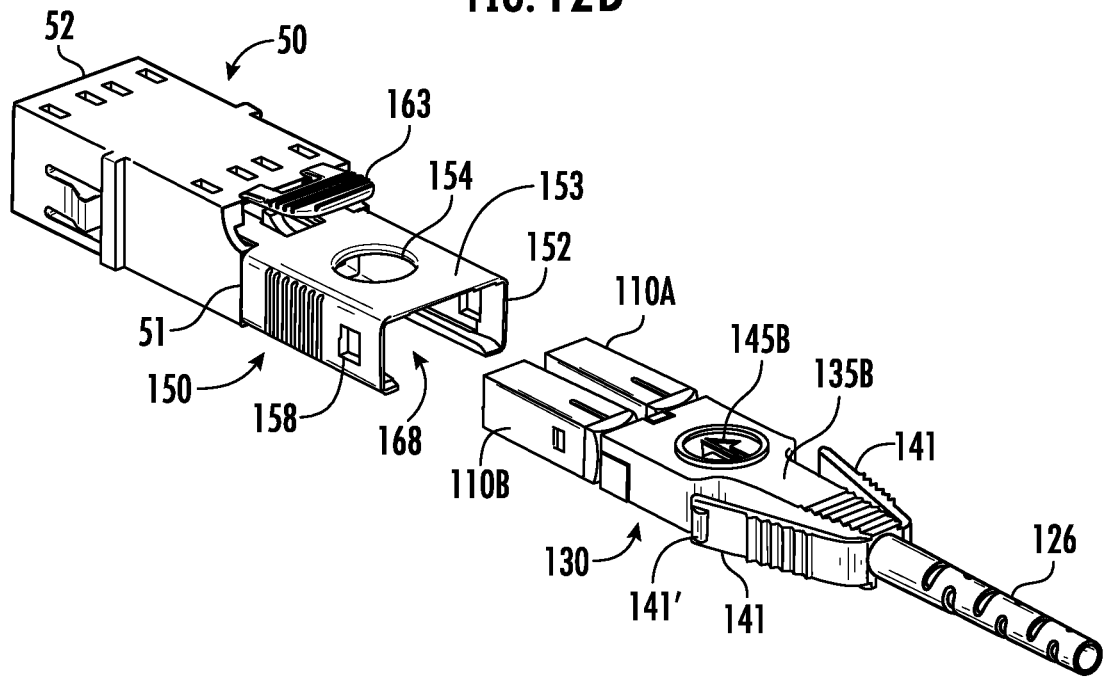
FIG. 13 is a perspective view of the adapter housing and duplex fiber optic connector assembly of FIG. 12A, with the latch housing retained by the adapter housing following removal from the latch housing of the primary housing and the first and second fiber optic connector subassemblies retained therein.

FIG. 13 shows the items of FIGS. 12A-12D following removal of the primary housing (with retained first and second fiber optic connector subassemblies 110A, 110B) from the latch housing 150, while the latch housing 150 remains engaged to the adapter housing 50. Such removal may be facilitated by manual pressing or squeezing of the lateral biasing members 141 to disengage the clasp elements 141' at tips of the lateral biasing members 141 from the latch apertures 158 of the latch housing 150, and pulling of the primary housing 130 in a rearward direction.

The duplex fiber optic connector assembly 100 may be coupled with adapter housings in a high-density manner in various configurations, as shown in FIGS. 14A to 16B.

Figure 14A:
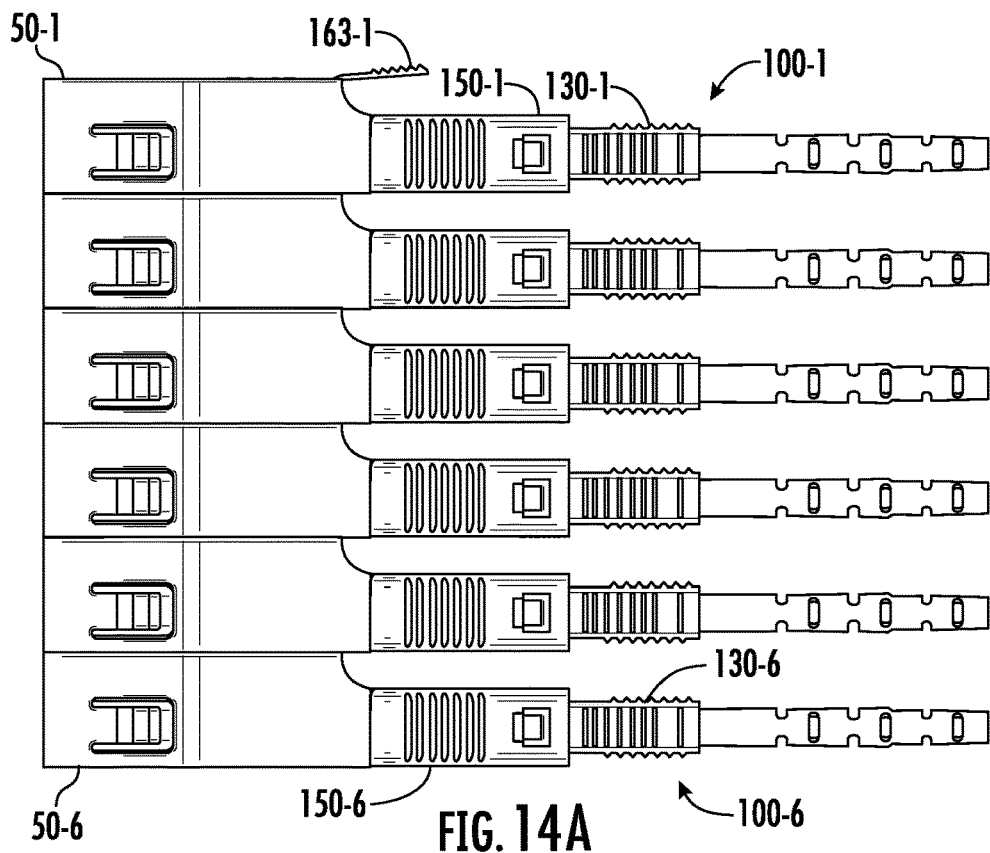
FIG. 14A is a side elevational view of six adapter housings and corresponding duplex fiber optic connector assemblies according to FIG. 6 retained therein, in a bottom-to-top vertically stacked configuration.
Figure 14B:
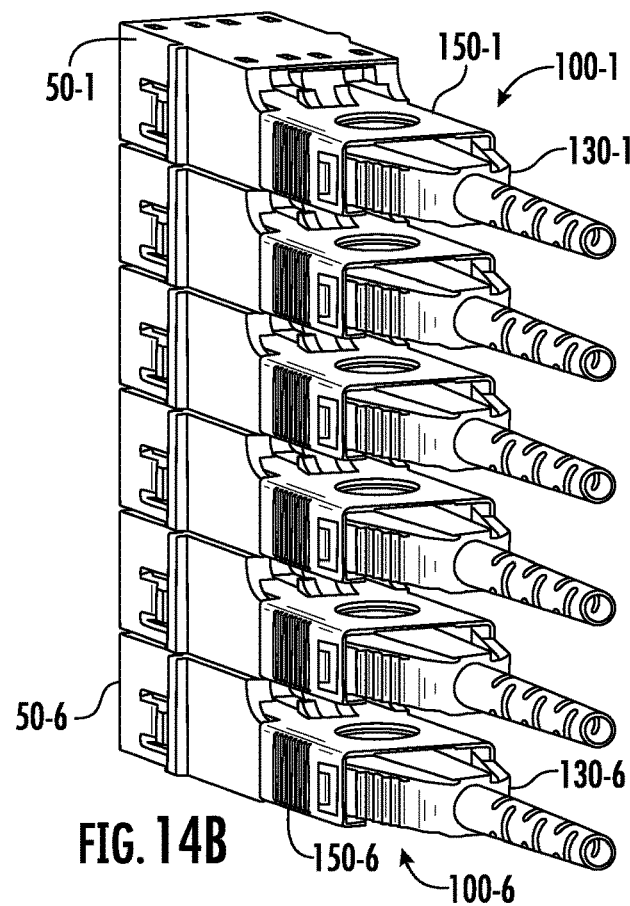
FIG. 14B is a perspective view of the items of FIG. 14A.

FIGS. 14A-14B show a vertical one-dimensional array of six adapter housings 50-1 to 50-6 in a bottom-to-top vertically stacked configuration, with each adapter housing 50-1 to 50-6 having received therein a corresponding duplex fiber optic connector assembly 100-1 to 100-6 (each including a latch housing 150-1 to 150-6 and a primary housing 130-1 to 130-6). While the close vertical spacing may render it difficult to manually remove individual ones of the vertically stacked primary housings 130-1 to 130-6 from the adapter housings 50-1 to 50-6, sufficient access is provided to permit each primary housing 130-1 to 130-6 to be manually removed from a corresponding latch housing 150-1 to 150-6.

Figure 15A:
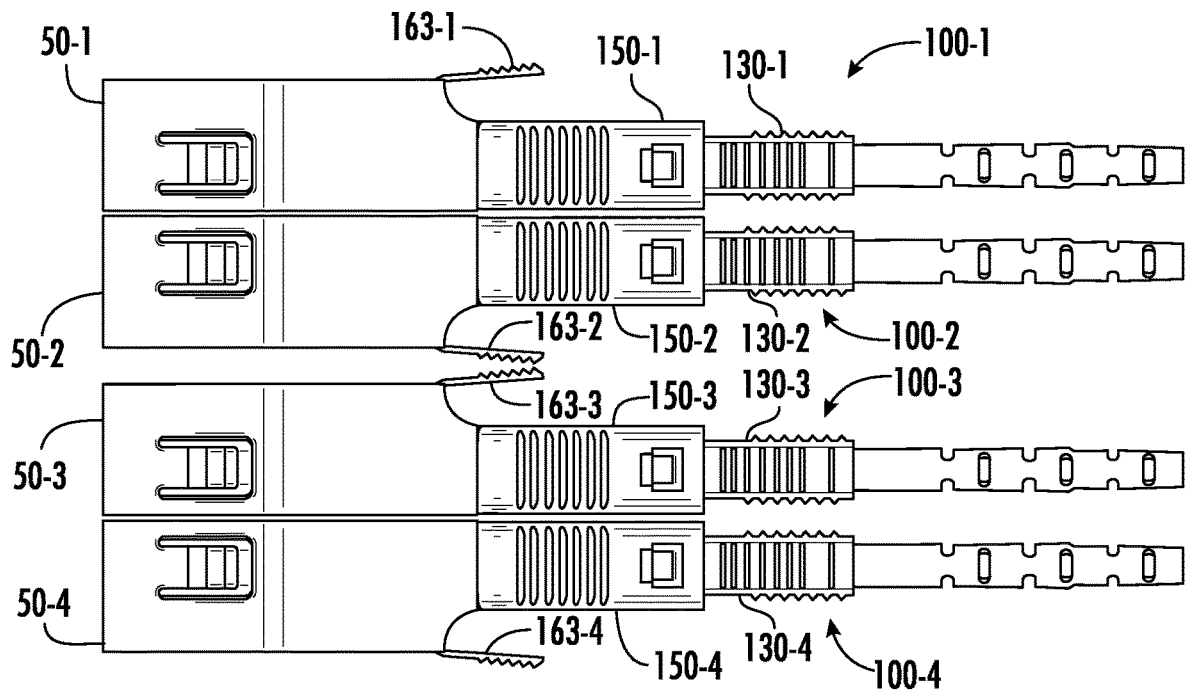
FIG. 15A is a side elevational plan view of two pairs of adapter housings and corresponding duplex fiber optic connector assemblies according to FIG. 6 retained therein, with each pair including two fiber optic connector assemblies arranged in a bottom-to-bottom stacked configuration.
Figure 15B:
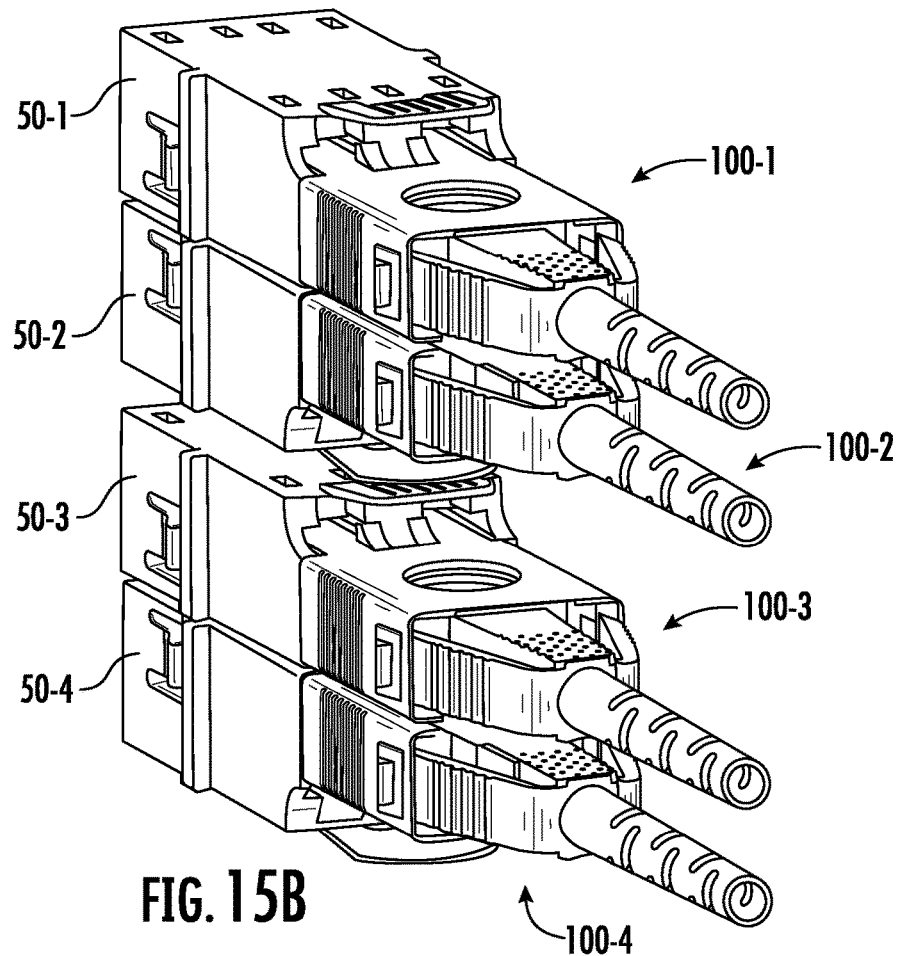
FIG. 15B is a perspective view of the items of FIG. 15A.

FIGS. 15A-15B show two pairs of adapter housings 50-1, 50-2, 50-3, 50-4 in a bottom-to-bottom stacked configuration, with each adapter housing 50-1 to 50-4 having received therein a corresponding duplex fiber optic connector assembly 100-1 to 100-4 (each including a latch housing 150-1 to 150-4 and a primary housing 130-1 to 130-4).

Figure 16A:
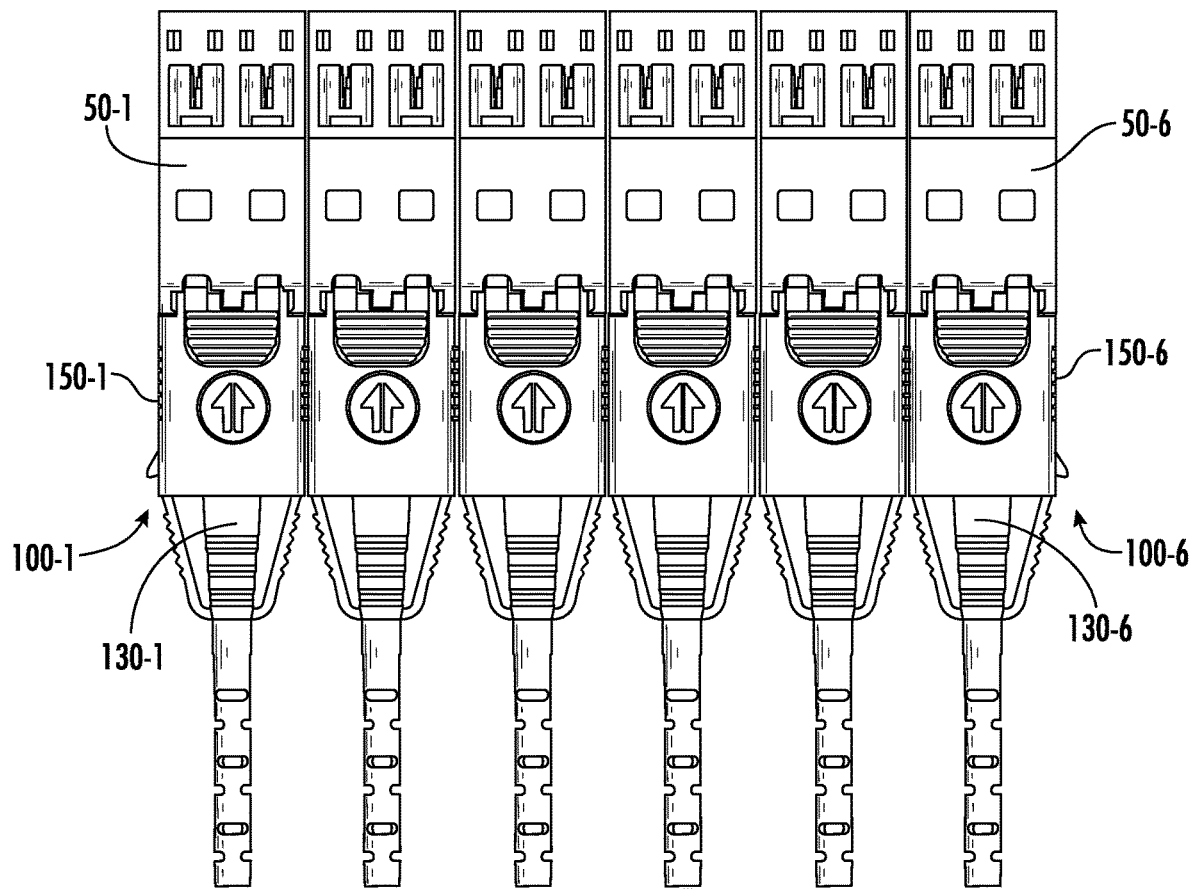
FIG. 16A is a side elevational view of six adapter housings and corresponding duplex fiber optic connector assemblies according to FIG. 6 retained therein, in arranged in a side-to-side one-dimensional array.
Figure 16B:
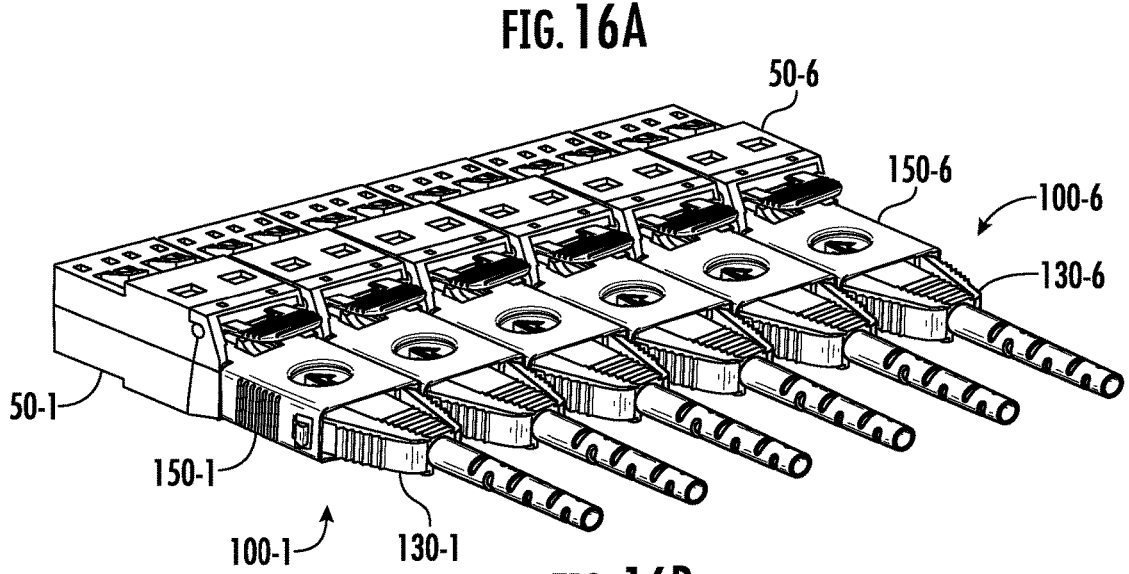
FIG. 16B is a perspective view of the items of FIG. 16A.

FIGS. 16A-16B show a horizontal one-dimensional array of six adapter housings 50-1 to 50-6 in a side-to-side configuration, with each adapter housing 50-1 to 50-6 having received therein a corresponding duplex fiber optic connector assembly 100-1 to 100-6 (each including a latch housing 150-1 to 150-6 and a primary housing 130-1 to 130-6).

Figure 17:
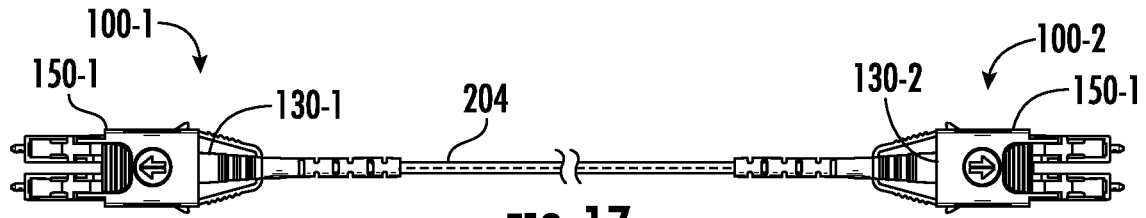
FIG. 17 is a top plan view a duplex fiber optic cable assembly terminated at each end by a fiber optic connector assembly according to FIG. 6.

FIG. 17 is a top plan view of a duplex fiber optic cable assembly 202 including a fiber optic cable 204 terminated at opposing ends by fiber optic connector assemblies 100-1, 100-2 (of a type according to FIG. 6) each including a primary housing 130-1, 130-2 releasably engaged to a latch housing 150-1, 150-2. Although the fiber optic cable assembly 202 is in the form of a jumper with similar connector assemblies 100-1, 1002 at opposing ends, it is to be appreciated that a fiber optic cable assembly may include a fiber optic connector assembly as disclosed herein at one end, while an opposing end of the cable assembly may include a fiber optic connector of any suitable type at an opposing end thereof.

Figure 18A:
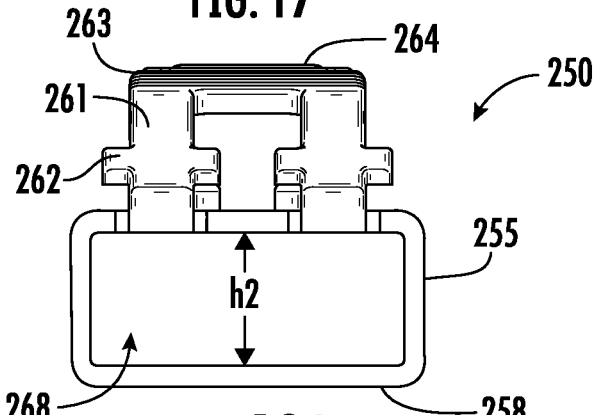
FIG. 18A is a front elevational view of an alternative latch housing useable with the duplex fiber optic connector assembly of FIG. 6, the latch housing including a continuous lower face.
Figure 18B:
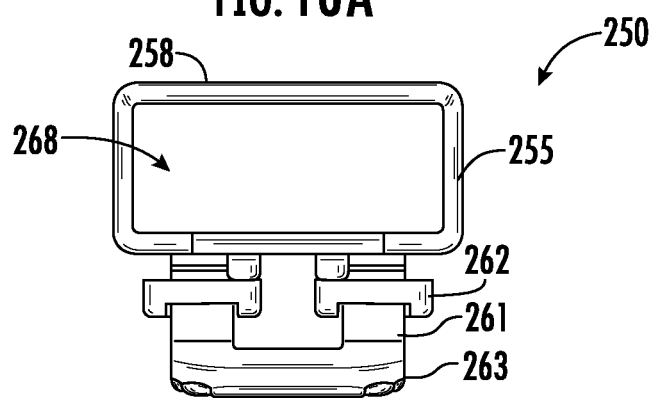
FIG. 18B is a rear elevational view of the latch housing of FIG. 18A.
Figure 19:
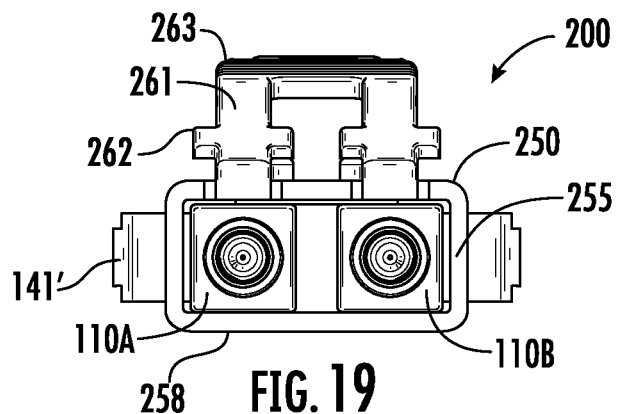
FIG. 19 is a front elevational view of the latch housing of FIGS. 18A-18B having first and second fiber optic connector subassemblies received therein.

Although the latch housing 150 shown in various preceding figures (including FIGS. 10A-10C) includes opposing lower face portions 157 that are separated from one another to cause the recess 168 to be open along a bottom thereof, in certain embodiments a latch housing may include a continuous lower face. FIGS. 18A-18B provide front and rear elevational views of a latch housing 250 of a duplex fiber optic connector assembly according to one embodiment that is substantially identical to the latch housing 150 previously described herein, except for presence of a continuous lower face 258. As shown, the latch housing 250 has an upper face, side walls 255, and a continuous lower face 258 that bound a recess 268 having a height $h_2$. The latch housing 250 further includes first and second latch members 261 having laterally protruding tab members 262, with rear portions of the latch members 261 being connected by a cross-member 263 having a textured surface 264. FIG. 19 is a front elevational view of the latch housing 250 of FIGS. 18A-18B having received therein a primary housing (130 in FIGS. 7C-7E) having first and second fiber optic connector subassemblies 110A, 110B.

Although various embodiments herein show a latch mechanism (including the latch members 161 with associated laterally protruding tab members and cross-member 163) of the latch housing 150 as being manually actuatable by pressing the cross-member 163 downward (toward upper face 153 of the latch housing), it is to be appreciated that any suitable latch mechanism may be used, and may be manually actuated by motions such as downward pressing, upward pressing, forward pushing, and rearward pulling. Likewise, although various embodiments show at least one engagement feature (e.g., lateral biasing members 141 with associated clasp elements 141') as being manually actuatable by squeezing or pressing the lateral biasing members 141 toward one another, it is to be appreciated that one, two, or any suitable number of engagement features may be provided, and may be manually actuated by motions such as squeezing laterally together, separating laterally apart, forward pushing, and rearward pulling.

Those skilled in the art will appreciate that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A duplex fiber optic connector assembly suitable for polarity reversal, comprising:
    a first fiber optic connector subassembly comprising a first ferrule retaining a first optical fiber;
    a second fiber optic connector subassembly comprising a second ferrule retaining a second optical fiber;
    a primary housing defining a first aperture and a second aperture for respectively receiving portions of the first and the second fiber optic connector subassemblies such that portions of the first and the second fiber optic connector subassemblies protrude in a forward direction from the primary housing, the primary housing further comprising:
        at least one engagement feature that is manually actuatable; and
        a base member and a cover member, wherein each of the base member and the cover member define complementary portions of the first aperture, and wherein each of the base member and the cover member define complementary portions of the second aperture; and
    a latch housing configured to matably receive the primary housing when the primary housing is an a first, upwardly-facing configuration and when the primary housing is in a second, downwardly-facing configuration, the latch housing comprising (i) at least one receiving feature configured to receive the at least engagement feature to permit releasable engagement between the primary housing and the latch housing, and (ii) a latch mechanism that is manually actuatable and configured to permit releasable engagement between the latch housing and a fiber optic adapter housing separate from the duplex fiber optic connector assembly;
    wherein, upon manual actuation of the at least one engagement feature, the duplex fiber optic connector assembly is configured to permit the primary housing to be removed from the latch housing by movement of the primary housing in a rearward direction that opposes the forward direction; and
    wherein the cover member comprises a first fiber polarity indicator, the base member comprises a second fiber polarity indicator, and the latch housing defines a window configured to (i) permit the first fiber polarity indicator to be visible when the primary housing is the first, upwardly-facing configuration, and (ii) permit the second fiber polarity indicator to be visible when the primary housing is in the second, downwardly-facing configuration.

2. The duplex fiber optic connector assembly of claim 1, wherein each of the first fiber optic connector subassembly and the second fiber optic assembly is devoid of any latch mechanism configured to mechanically engage the respective first fiber optic connector subassembly or the second fiber optic connector subassembly with a fiber optic adapter housing separate from the duplex fiber optic connector assembly.

3. The duplex fiber optic connector assembly of claim 1, wherein:
    the latch housing defines a recess configured to receive at least a portion of the primary housing;
    the recess has a recess height and a recess width;
    the recess width is greater than a combined width of the first fiber optic connector subassembly and the second fiber optic connector subassembly;
    the recess height is greater than a maximum height of the first fiber optic connector subassembly; and
    the recess height is greater than a maximum height of the second fiber optic connector subassembly.

4. The duplex fiber optic connector assembly of claim 3, wherein the recess of the latch housing is bounded by an upper face and two opposing side walls of the latch housing.

5. The duplex fiber optic connector assembly of claim 1, wherein the base member is mechanically coupled with the cover member to enclose a cavity within the primary housing.

6. The duplex fiber optic connector assembly of claim 1, wherein the at least one engagement feature comprises opposing first and second lateral biasing members, and the at least one receiving feature comprises opposing first and second lateral openings configured to receive respective portions of the first and second lateral biasing members.

7. The duplex fiber optic connector assembly of claim 6, wherein:
    the primary housing comprises a rear end, and each of the first lateral biasing member and the second lateral biasing member extends forwardly and laterally outwardly from the rear end of the primary housing.

8. The duplex fiber optic connector assembly of claim 7, wherein the first and second lateral biasing members are configured to be actuated by manually pressing or squeezing the first and second lateral biasing members toward one another, to permit the primary housing to be disengaged from the latch housing.

9. The duplex fiber optic connector assembly of claim 1, wherein:
    the latch housing comprises a first forwardly-protruding portion configured to be arranged over the first fiber optic connector subassembly, and a second forwardly-protruding portion configured to be arranged over the second fiber optic connector subassembly; and
    the latch mechanism comprises a first latch member protruding upwardly and rearwardly from the first forwardly-protruding portion, a second latch member protruding upwardly and rearwardly from the second forwardly-protruding portion, and a cross-member connecting rear portions of the first latch member and the second latch member.

10. The duplex fiber optic connector assembly of claim 9, wherein the first latch member comprises first laterally protruding tab members, and the second latch member comprises second laterally protruding tab members.

11. The duplex fiber optic connector assembly of claim 1, wherein:
    the first fiber optic connector subassembly comprises a first fiber optic connector body, and first ferrule is forwardly biased by a first spring within the first fiber optic connector body; and the second fiber optic connector subassembly comprises a second fiber optic connector body, and second ferrule is forwardly biased by a second spring within the second fiber optic connector body.

12. The duplex fiber optic connector assembly of claim 1, wherein:
the latch mechanism is configured to be pressed or squeezed in a first direction to permit releasable engagement between the latch housing and the fiber optic adapter housing separate from the duplex fiber optic connector assembly; and
the at least one engagement feature of the primary housing is configured to be pressed or squeezed in a second direction to permit releasable engagement between the primary housing and the latch housing;
wherein the second direction is orthogonal to the first direction.

13. A fiber optic cable assembly, comprising:
a fiber optic cable that includes a first optical fiber and a second optical fiber;
a duplex fiber optic connector assembly terminating at least one end of the fiber optic cable, wherein the duplex fiber optic connector assembly comprises:
a first fiber optic connector subassembly comprising a first ferrule retaining the first optical fiber;
a second fiber optic connector subassembly comprising a second ferrule retaining the second optical fiber;
a primary housing defining a first aperture and a second aperture for respectively receiving portions of the first and the second fiber optic connector subassemblies such that portions of the first and the second fiber optic connector subassemblies protrude in a forward direction from the primary housing, the primary housing further comprising:
at least one engagement feature that is manually actuatable; and
a base member and a cover member, wherein each of the base member and the cover member define complementary portions of the first aperture, and wherein each of the base member and the cover member define complementary portions of the second aperture; and
a latch housing configured to matably receive the primary housing when the primary housing is an a first, upwardly-facing configuration and when the primary housing is in a second, downwardly-facing configuration, the latch housing comprising (i) at least one receiving feature configured to receive the at least engagement feature to permit releasable engagement between the primary housing and the latch housing, and (ii) a latch mechanism that is manually actuatable and configured to permit releasable engagement between the latch housing and a fiber optic adapter housing separate from the duplex fiber optic connector assembly;
wherein, upon manual actuation of the at least one engagement feature, the duplex fiber optic connector assembly is configured to permit the primary housing to be removed from the latch housing by movement of the primary housing in a rearward direction that opposes the forward direction; and
wherein the cover member comprises a first fiber polarity indicator, the base member comprises a second fiber polarity indicator, and the latch housing defines a window configured to (i) permit the first fiber polarity indicator to be visible when the primary housing is the first, upwardly-facing configuration, and (ii) permit the second fiber polarity indicator to be visible when the primary housing is in the second, downwardly-facing configuration.

14. A method for fabricating a fiber optic cable assembly, the method comprising:
terminating a first optical fiber in a first ferrule of a first fiber optic connector subassembly;
terminating a second optical fiber in a second ferrule of a second fiber optic connector subassembly;
receiving a rear portion of the first fiber optic connector subassembly in a first aperture defined in a primary housing of a duplex fiber optic connector assembly such that a front portion of the first fiber optic connector subassembly protrudes from the primary housing in a forward direction, and receiving a rear portion of the second fiber optic connector subassembly in a second aperture defined in the primary housing of the duplex fiber optic connector assembly such that a front portion of the second fiber optic connector subassembly protrudes from the primary housing in the forward direction, wherein:
the primary housing comprises a base member and a cover member,
each of the base member and the cover member define complementary portions of the first aperture, and
each of the base member and the cover member define complementary portions of the second aperture; and
effecting relative movement between the primary housing and a latch housing of the duplex fiber optic connector assembly to cause the primary housing to move forwardly and/or the latch housing to move rearwardly, while causing at least one engagement feature of the primary housing that is manually actuatable to be engaged with at least one receiving feature of the latch housing to permit releasable engagement between the primary housing and the latch housing, wherein the latch housing is configured to matably receive the primary housing when the primary housing is an a first, upwardly-facing configuration and when the primary housing is in a second, downwardly-facing configuration;
wherein the latch housing comprises a latch mechanism that is manually actuatable and configured to permit releasable engagement between the latch housing and a fiber optic adapter housing separate from the duplex fiber optic connector assembly; and
wherein, upon manual actuation of the at least one engagement feature, the duplex fiber optic connector is configured to permit the primary housing to be removed from the latch housing by movement of the primary housing in a rearward direction that opposes the forward direction; and
wherein the cover member comprises a first fiber polarity indicator, the base member comprises a second fiber polarity indicator, and the latch housing defines a window configured to (i) permit the first fiber polarity indicator to be visible when the primary housing is the first, upwardly-facing configuration, and (ii) permit the second fiber polarity indicator to be visible when the primary housing is in the second, downwardly-facing configuration.

* * * * *